(12) United States Patent
Fees et al.

(10) Patent No.: US 10,516,146 B2
(45) Date of Patent: Dec. 24, 2019

(54) FIXATION OF A BATTERY MODULE IN A BATTERY MODULE COMPARTMENT OF AN ENERGY STORAGE SYSTEM

(71) Applicant: InEVit LLC, Santa Clara, CA (US)

(72) Inventors: Heiner Fees, Bietigheim-Bissingen (DE); Andreas Track, Sachsenheim (DE); Alexander Eichhorn, Eppingen (DE); Ralf Maisch, Abstatt (DE); Jörg Damaske, Freiberg (DE)

(73) Assignee: TIVENI MERGECO, INC., San Mateo, CA (US)

( * ) Notice: Subject to any disclaimer, the term of this patent is extended or adjusted under 35 U.S.C. 154(b) by 130 days.

(21) Appl. No.: 15/794,438

(22) Filed: Oct. 26, 2017

(65) Prior Publication Data

US 2018/0123100 A1    May 3, 2018

Related U.S. Application Data

(60) Provisional application No. 62/414,247, filed on Oct. 28, 2016, provisional application No. 62/444,875, filed on Jan. 11, 2017.

(51) Int. Cl.
*H01M 2/10* (2006.01)
*H01M 10/42* (2006.01)
(Continued)

(52) U.S. Cl.
CPC ............ *H01M 2/1083* (2013.01); *B60K 1/04* (2013.01); *B60S 5/06* (2013.01); *F16B 13/143* (2013.01);
(Continued)

(58) Field of Classification Search
CPC .. H01M 2/1083; H01M 10/42; H01M 2/1077; B60K 1/04
See application file for complete search history.

(56) References Cited

U.S. PATENT DOCUMENTS 3,269,865 A * 8/1966 Swanson ............... H01M 10/16
429/176
5,626,982 A * 5/1997 Kawai ..................... B32B 27/32
429/120
(Continued)

FOREIGN PATENT DOCUMENTS

EP    3051607 A1    8/2016
JP    2000318462 A    11/2000

OTHER PUBLICATIONS

International Search Report and Written Opinion dated Feb. 1, 2018 in International Application No. PCT/US2017/058850.
(Continued)

*Primary Examiner* — Stewart A Fraser
(74) *Attorney, Agent, or Firm* — Muncy, Geissler, Olds & Lowe, P.C.; Daniel Podhajny

(57) ABSTRACT

In an embodiment, an expansion component (e.g., expanding foam element, inflatable pad, a pneumatic or hydraulic mechanism, etc.) is arranged inside of a battery module compartment (e.g., on a bottom interior surface of the battery module compartment). A battery module is inserted into the battery module component and is fixated, or secured, within the battery module compartment at least in part based upon the expanding component which starts to expand or continues to expand after the insertion. In a further embodiment, the battery module may be removed from the battery module compartment after a contraction function (e.g., collapse of the foam element, deflation of the inflatable pad, etc.) of the expansion component is initiated.

26 Claims, 21 Drawing Sheets

(51) Int. Cl.
*B60K 1/04* (2019.01)
*F16B 13/14* (2006.01)
*B60S 5/06* (2019.01)
*H01M 10/052* (2010.01)
*B60K 1/00* (2006.01)
*B60K 11/02* (2006.01)

(52) U.S. Cl.
CPC ........... *H01M 2/10* (2013.01); *H01M 2/1077* (2013.01); *H01M 10/42* (2013.01); *B60K 11/02* (2013.01); *B60K 2001/005* (2013.01); *B60K 2001/0438* (2013.01); *B60K 2001/0455* (2013.01); *B60K 2001/0461* (2013.01); *H01M 10/052* (2013.01); *H01M 2220/20* (2013.01); *Y02T 90/124* (2013.01)

(56) References Cited

U.S. PATENT DOCUMENTS

| | | | |
|---|---|---|---|
| 6,517,967 | B1 | 2/2003 | Shrim et al. |
| 10,205,153 | B2* | 2/2019 | Yang ................ B60L 58/14 |
| 2007/0292723 | A1* | 12/2007 | Ikeda ................ H01M 2/105 |
| | | | 429/7 |
| 2008/0118825 | A1* | 5/2008 | Yoon ................ H01M 2/0404 |
| | | | 429/122 |
| 2010/0255351 | A1 | 10/2010 | Ijaz et al. |

OTHER PUBLICATIONS

Extended European search report dated Aug. 28, 2019 in European Application No. 19179662.

* cited by examiner

FIXATION OF A BATTERY MODULE IN A BATTERY MODULE COMPARTMENT OF AN ENERGY STORAGE SYSTEM

CROSS-REFERENCE TO RELATED APPLICATIONS

The present Application for Patent claims the benefit of U.S. Provisional Application No. 62/414,247, entitled "FIXATION OF BATTERY MODULES WITH A CURING PART TO COMPENSATE TOLERANCES", filed Oct. 28, 2016, and also to U.S. Provisional Application No. 62/444,875, entitled "FIXATION OF BATTERY MODULES AND OTHER PARTS TO COMPENSATE TOLERANCES", filed Jan. 11, 2017, each of which is assigned to the assignee hereof and hereby expressly incorporated by reference herein in its entirety.

BACKGROUND

1. Field of the Disclosure

Embodiments relate to fixation of a battery module in a battery module compartment of an energy storage system.

2. Description of the Related Art

Energy storage systems may rely upon batteries for storage of electrical power. For example, in certain conventional electric vehicle (EV) designs (e.g., fully electric vehicles, hybrid electric vehicles, etc.), a battery housing mounted into an electric vehicle houses a plurality of battery cells (e.g., which may be individually mounted into the battery housing, or alternatively may be grouped within respective battery modules that each contain a set of battery cells, with the respective battery modules being mounted into the battery housing). The battery modules in the battery housing are connected in series via busbars to a battery junction box (BJB), and the BJB distributes electric power provided from the busbars to an electric motor that drives the electric vehicle, as well as various other electrical components of the electric vehicle (e.g., a radio, a control console, a vehicle Heating, Ventilation and Air Conditioning (HVAC) system, internal lights, external lights such as head lights and brake lights, etc.).

SUMMARY

An embodiment is directed to a battery module fixation arrangement, including a battery module compartment, a battery module arranged inside the battery module compartment, and an expansion component arranged between at least a portion of at least one side of the battery module and an interior surface of the battery module compartment, the expansion component configured to expand after insertion of the battery module into the battery module compartment so as to secure the battery module inside the battery module compartment.

Another embodiment is directed to a method of fixing a battery module inside of a battery module compartment, including arranging an expansion component on an interior surface of the battery module compartment, inserting the battery module into the battery module compartment, wherein the expansion component is positioned between at least a portion of at least one side of the battery module and the interior surface of the battery module compartment after the inserting, and wherein the expansion component is configured to start to expand or continue expanding after the inserting so as to secure the battery module inside the battery module compartment.

Another embodiment is directed to a method of removing a battery module from a battery module compartment, including initiating a contraction function of an expansion component while the expansion component is in an expanded state, the expansion component in the expanded state being positioned between at least a portion of at least one side of the battery module and an interior surface of the battery module compartment, and removing, after the expansion component is contracted by the contraction function, the battery module from the battery module compartment.

BRIEF DESCRIPTION OF THE DRAWINGS

A more complete appreciation of embodiments of the disclosure will be readily obtained as the same becomes better understood by reference to the following detailed description when considered in connection with the accompanying drawings, which are presented solely for illustration and not limitation of the disclosure, and in which.

DETAILED DESCRIPTION

Embodiments of the disclosure are provided in the following description and related drawings. Alternate embodiments may be devised without departing from the scope of the disclosure. Additionally, well-known elements of the disclosure will not be described in detail or will be omitted so as not to obscure the relevant details of the disclosure.

Energy storage systems may rely upon batteries for storage of electrical power. For example, in certain conventional electric vehicle (EV) designs (e.g., fully electric vehicles, hybrid electric vehicles, etc.), a battery housing mounted into an electric vehicle houses a plurality of battery cells (e.g., which may be individually mounted into the battery housing, or alternatively may be grouped within respective battery modules that each contain a set of battery cells, with the respective battery modules being mounted into the battery housing). The battery modules in the battery housing are connected in series via busbars to a battery junction box (BJB), and the BJB distributes electric power provided from the busbars to an electric motor that drives the electric vehicle, as well as various other electrical components of the electric vehicle (e.g., a radio, a control console, a vehicle Heating, Ventilation and Air Conditioning (HVAC) system, internal lights, external lights such as head lights and brake lights, etc.).

Figure 1:
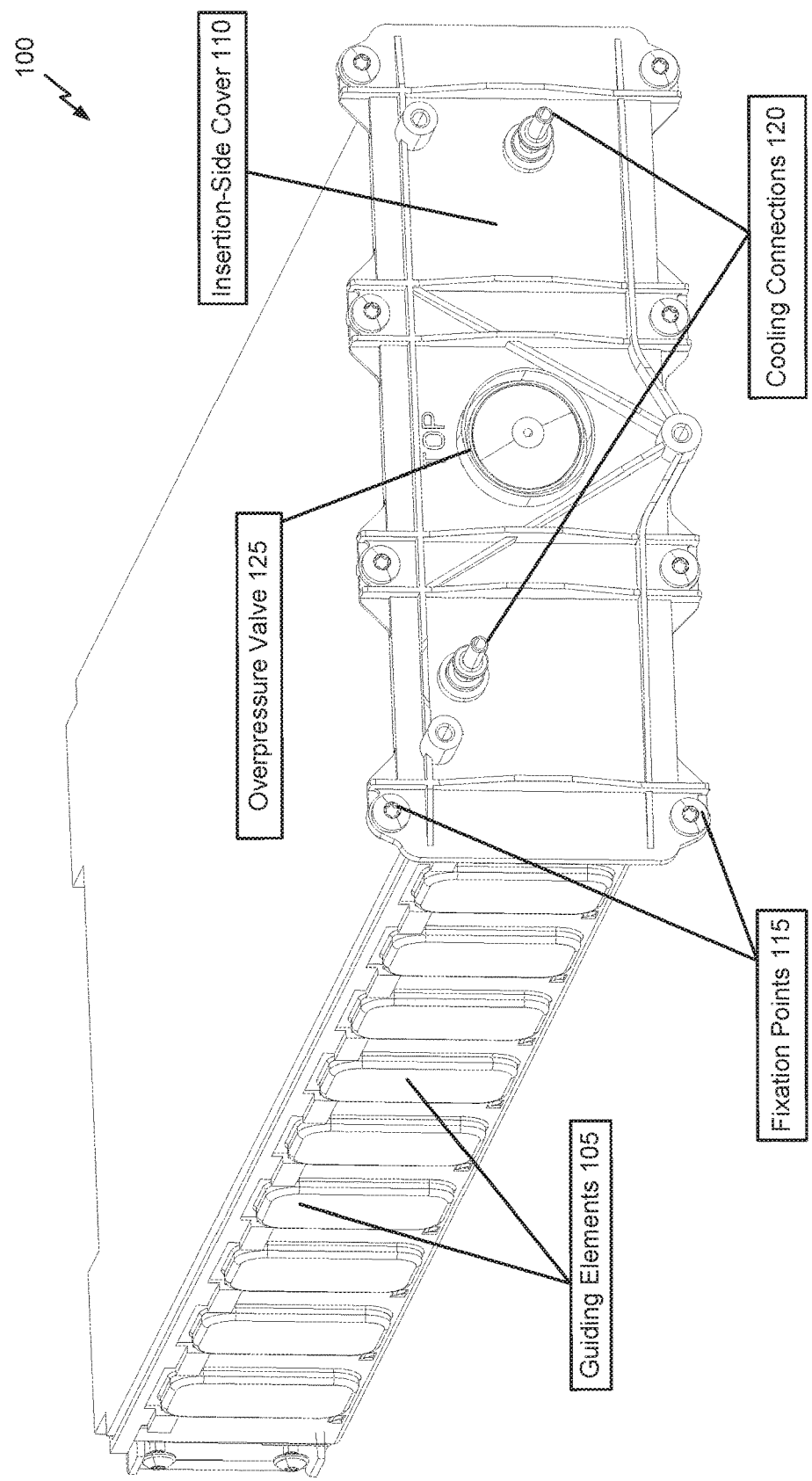
FIG. 1 illustrates a front-perspective of an exterior framing of a battery module in accordance with an embodiment of the disclosure.
Figure 2A:
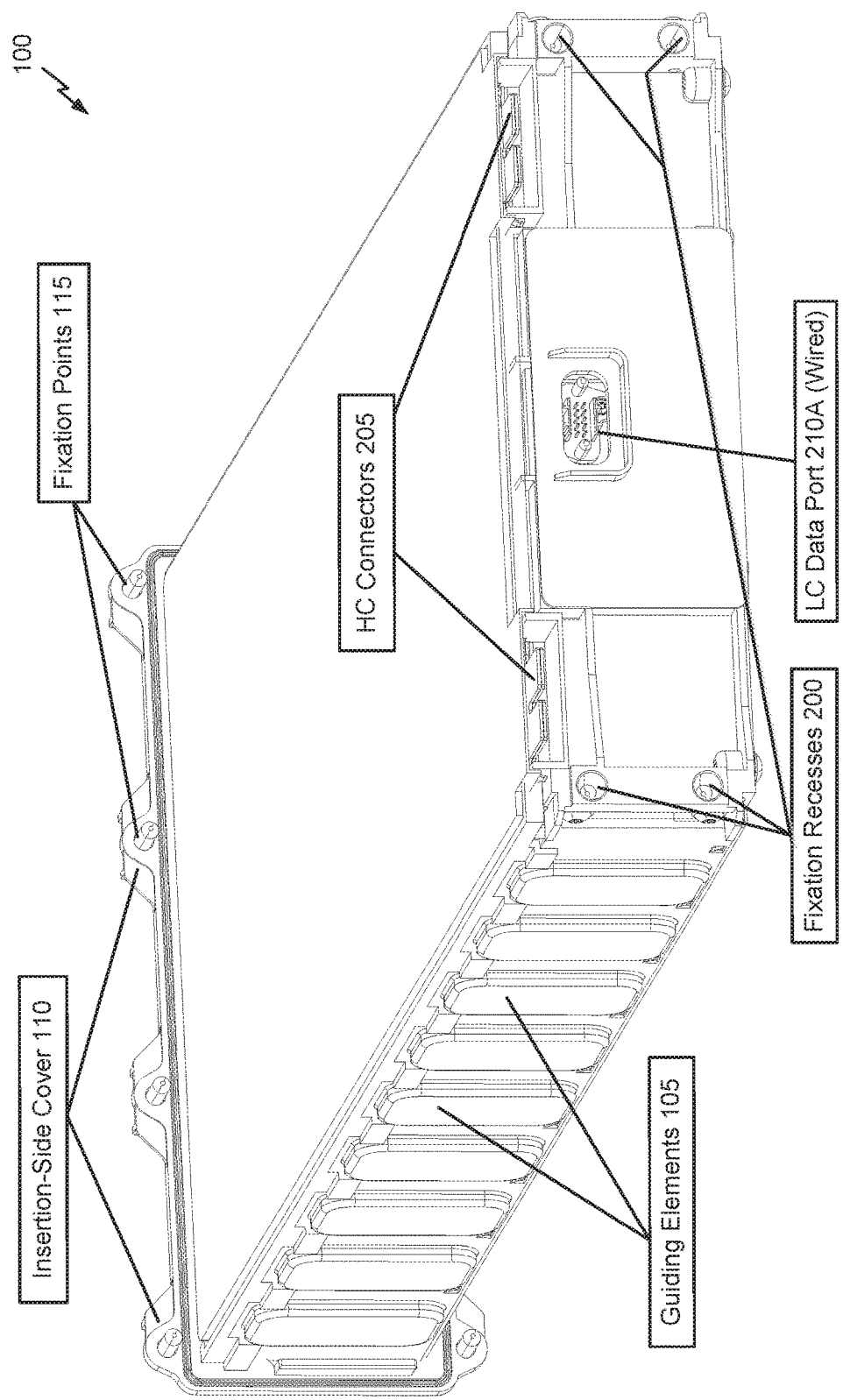
FIGS. 2A-2B illustrates alternative back-perspectives of the exterior framing of the battery module of FIG. 1 in accordance with an embodiment of the disclosure.
Figure 2B:
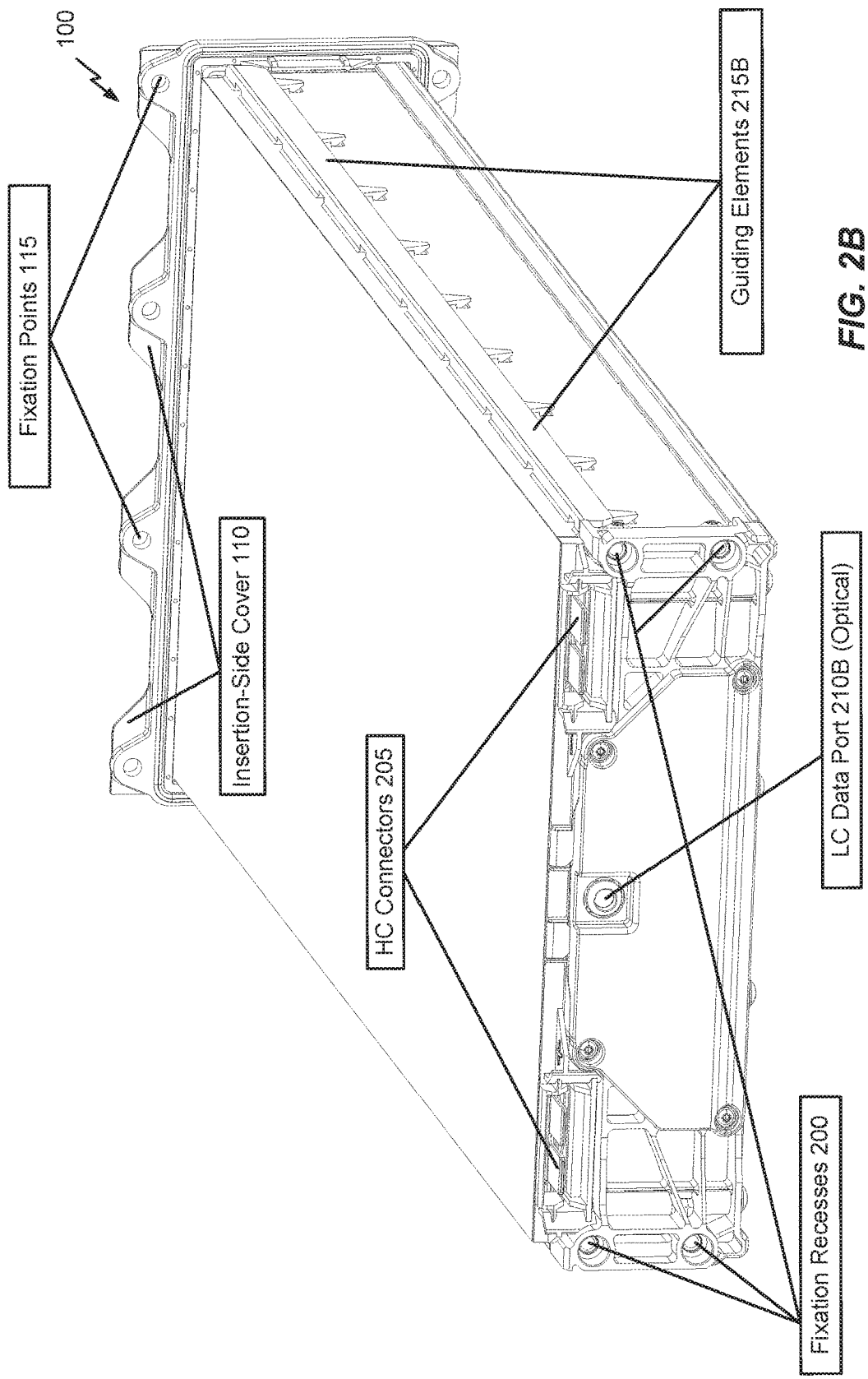

FIG. 1 illustrates a front-perspective of an exterior framing of a battery module 100 in accordance with an embodiment of the disclosure. FIGS. 2A-2B illustrate alternative rear-perspectives of the exterior framing of the battery module 100 in accordance with embodiments of the disclosure. In the examples of FIGS. 1-2B, the battery module 100 is configured for insertion into a battery module compartment. For example, in FIGS. 1-2B, each side of the battery module 100 includes guiding elements 105 or 215B to facilitate insertion into (and/or removal out of) the battery module compartment. In a further example, the guiding elements 105 or 215B are configured to fit into grooves inside the battery module compartment to facilitate insertion and/or removal of the battery module 100. An insertion-side cover 110 (or endplate) is integrated into the battery module 100. Upon insertion, the insertion-side cover 110 may be attached or affixed to the battery module compartment (e.g., via fixation points 115, such as bolt-holes, etc.) to seal the battery module 100 inside the battery module compartment using a cover (or endplate) integrated sealing system (e.g., rubber ring, paper gasket, sealant adhesive, etc.). While the insertion-side cover 110 is depicted in FIGS. 1-2B as integrated into the battery module 100, the insertion-side cover 110 may alternatively be independent (or separate) from the battery module 100, with the battery module 100 first being inserted into the battery module compartment, after which the insertion-side cover 110 is attached.

Referring to FIGS. 1-2B, the insertion-side cover 110 includes fixation points 115 provisioned on a flange, a set of cooling connections 120, and an overpressure valve 125. In an example, the fixation points 115 may be bolt-holes through which bolts may be inserted, and the set of cooling connections 120 may include input and output cooling tube connectors (e.g., through which coolant fluid is pumped into the battery module 100 for cooling one or more cooling plates). The overpressure valve 125 may be configured to open when pressure inside of the battery module 100 exceeds a threshold (e.g., to avoid an explosion or overpressure by degassing in case of a thermal run away of a battery cell in the battery module 100).

In an alternative embodiment, the fixation points 115 and associated flange can be omitted, and a different fixation mechanism (e.g., a clip or clamping mechanism) can be used to secure the battery module 100 inside a respective battery module compartment.

Referring to FIGS. 2A-2B, the battery module 100 further includes a set of fixation recesses 200 (e.g., to position and secure the battery module 100 in the battery module compartment while inserted), and a set of high current (HC) connectors 205 (e.g., corresponding to positive and negative terminals of the battery module 100, each of which may be connected, via bolting, screwing or plugging, to an electrical interface that is coupled to either the BJB or another battery module). In FIG. 2A, the battery module includes a wired HC data port 210A (e.g., to connect internal sensors of the battery module 100 to the BJB (not shown in FIG. 2A) via a wired LC module-to-tunnel interface (not shown in FIG. 2A) in the battery module compartment). In FIG. 2B, the battery module includes an optical LC data port 210B (e.g., to connect internal sensors of the battery module 100 to the BJB (not shown in FIG. 2B) via an optical LC module-to-tunnel interface (not shown in FIG. 2B) in the battery module compartment, such as a light tube). In an example, the optical LC data port 210B, upon insertion of the battery module 100 into the battery module compartment, may be pressed against the optical LC module-to-tunnel interface (not shown in FIG. 2B) so that optical signals can be exchanged with the BJB through light tube(s) in the tunnel space without collecting dust or other debris. Accordingly, the battery module 100 is configured such that, upon insertion into the battery module compartment, the HC connectors 205 and the LC data port 210A or 210B are each secured and connected (e.g., plugged into, or pressed against and sealed) corresponding connectors in the battery module compartment. As used herein, reference to "LC" and "HC" is generally used to distinguish between data connections (i.e., LC) and power connections (i.e., HC). Generally, power connections are associated with higher currents and/or voltages (e.g., suitable for powering a drive motor of an electric vehicle), while data connections are associated with lower currents and/or voltages (e.g., suitable for data communication, although low-power loads may also be supported, such as a Universal Serial Bus (USB) charging load).

Various embodiments of the disclosure described herein relate to securing (or fixation of) a battery module (e.g., battery module 100 of FIG. 1) inside of a battery module compartment. Below, an example battery housing configuration containing a plurality of battery module compartments for powering an electric vehicle is described, followed by examples of fixation of the battery module 100 of FIG. 1 inside one of the respective battery module compartments. However, it will be appreciated that the battery module fixation embodiments described below may be applied to battery module compartments in any particular battery housing for any energy storage system type, and not merely for an electric vehicle.

Figure 3A:
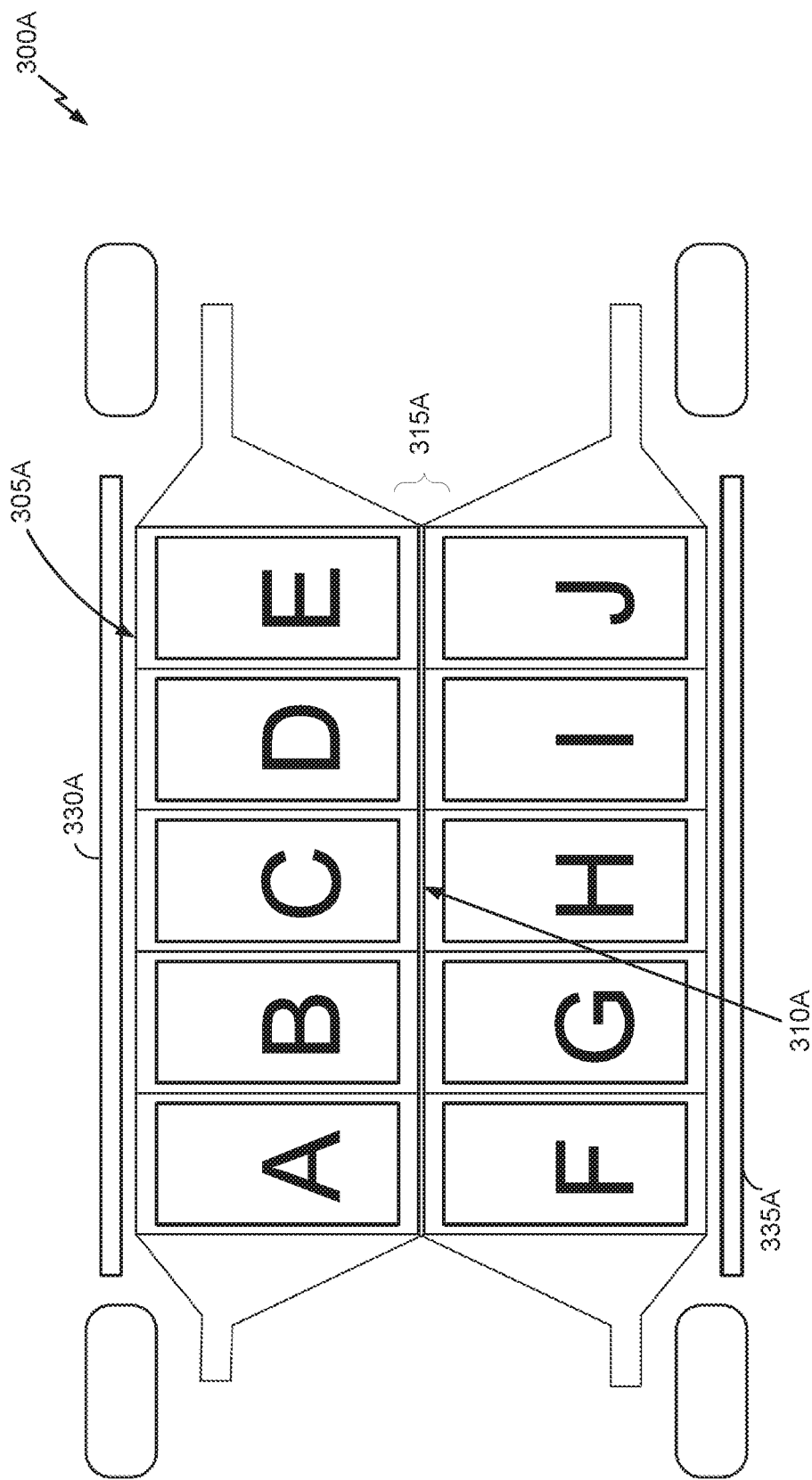
FIG. 3A illustrates a top-perspective of a cross-section of an electric vehicle including a battery housing in accordance with an embodiment of the disclosure.

FIG. 3A illustrates a top-perspective of a cross-section of an electric vehicle 300A including a battery housing 305A in accordance with an embodiment of the disclosure. FIG. 3A depicts various well-known components (e.g., wheels, axles, etc.) of the electric vehicle 300A to provide general context, but these components are not described in detail below for the sake of brevity. With respect to FIG. 3A and other FIGS described below, reference to battery "housing" and battery "module mounting area" is somewhat interchangeable. The battery module mounting area in FIG. 3A (and other FIGS described below) refers to an arrangement of battery module compartments configured to receive insertion of battery modules and to be sealed via insertion-side covers to form a battery housing. Further, in at least one embodiment, the battery module mounting area is part of a floor of the electric vehicle 300A.

Referring to FIG. 3A, the battery housing 305A includes ten battery module compartments denoted as A . . . J, and a middle bar 310A that is positioned between battery module compartments A . . . E and battery module compartments F . . . J on different longitudinal sides of the electric vehicle 300A. Each battery module compartment includes a frame (or plurality of walls) defining an interior space configured to fit a respective battery module, and an insertion-side which may be opened to facilitate insertion and/or removal of the respective battery module. The middle bar 310A may be constructed from the dividers (or firewalls) that separate laterally adjacent (e.g., aligned width-wise as a left/right pairing in the electric vehicle 300A) battery module compartments A . . . J (e.g., the firewall between battery module compartments A and F, the firewall between battery module compartments B and G, etc.).

In an example, the middle bar 310A may be one single longitudinal "bar" that extends across the entirety of the battery housing 305A. In this case, the interior side-walls of each battery module compartment may be attached to the middle bar 310A to form the battery module mounting area. In an alternative example, each laterally adjacent battery module compartment pair may be pre-constructed as a battery module compartment chamber with its own chamber-specific firewall for separating its respective laterally adjacent battery module compartments. The battery module compartment chambers may be stacked longitudinally to form the battery module mounting area. In this case, the middle bar 310A is an aggregation of the individual firewalls contained in each respective battery module compartment chamber across the battery housing 305A.

While the middle bar 310A is illustrated in FIG. 3A as being centered in the battery housing 305A, the middle bar 310A can be positioned in other locations (e.g., closer to one side or the other, so as to fit differently-sized battery modules on left and right sides of the battery module mounting area) in other embodiments. Further, multiple middle bars could be deployed in other implementations. For example, a particularly wide vehicle may be equipped with a battery module mounting area that is wider than the lengths of two battery modules, such that a gap may be present between the two battery modules when inserted into a laterally adjacent pair of battery module compartments. In this case, two separate firewalls may be used for each laterally adjacent battery module compartment so that respective battery modules can comfortably fit therein, with a gap in-between the two firewalls. The two firewalls may form part of two separate "middle" bars (even though each respective firewall may be offset from a center or middle of the battery housing 305A), with the two separate middle bars either corresponding to two long "bars" extending across the battery housing 305A or two aggregations of chamber-specific firewalls from longitudinally stacked battery module compartment chambers. In at least one embodiment, the gap between the two separate middle bars may be used as a tunnel space (e.g., to facilitate optical communication, to run LC/HC busbars, etc.), although the embodiments describe below relate to an implementation where the tunnel space is defined above the battery module compartments, and not in a gap between laterally adjacent battery module compartments.

It will be appreciated that the battery housing 305A including ten battery module compartments A . . . J is shown in FIG. 3A for example purposes only. For example, an electric vehicle with a longer wheel base may be configured with a battery housing having more battery module compartments (e.g., 12, 14, etc.), while an electric vehicle with a shorter wheel base may be configured with a battery housing having fewer battery module compartments (e.g., 8, 6, etc.). The battery module compartments A . . . E are arranged longitudinally (i.e., lengthwise with respect to electric vehicle 300A) on a right-side of the electric vehicle 300A, while battery module compartments F . . . J are arranged longitudinally on a left-side of the electric vehicle 300A.

As used herein, a "battery module" is a package that contains a plurality of battery cells, such as lithium ion battery cells or battery cells made from a different electrode material. Battery modules may be configured with a prismatic or pouch battery cell arrangement (sometimes referred to as a soft pack), while other battery modules are configured with a cylindrical battery cell arrangement.

As used herein, a battery module compartment being "sealed" refers to a seal that is at least water-tight or liquid-tight, and optionally gas-tight (at least, with respect to certain gases such as smoke from fire, carbon, electrolyte particles, dust and debris, etc.). Generally, the sealing of the battery module compartments is a result of its interior walls being welded or glued together (where possible), and any connection interfaces (e.g., insertion-side cover, coolant interface plugs, electrical interface connectors, etc.) being sealed with a suitable type of sealant (e.g., O-ring, rubber gasket, sealing compound, etc.). While the sealing of the battery module compartments could potentially be hermetic (e.g., gas-tight with respect to all gases), hermetic sealing is not necessary (e.g., due to high cost). Accordingly, the sealing of the battery module compartments may be configured to block propagation of likely contaminants (e.g., liquids such as water, flames and/or smoke from fires, carbon, electrolyte particles, dust and debris, etc.) from entering into battery module compartments from an external environment and/or from exiting the battery module compartments towards a protected area (e.g., a passenger cabin of an electric vehicle). Moreover, while various embodiments described below relate to lateral or side-insertion of battery modules into respective battery module compartments, the insertion-side for the battery module compartments A . . . J may vary between different battery module mounting area configurations.

Referring to FIG. 3A, the middle bar 310A is configured to increase the overall stiffness of the battery housing 305A (and thereby, the electric vehicle 300A). In an example, the middle bar 310A may be positioned underneath a tunnel space 315A that, similar to the middle bar 310A, may be centered between battery module compartments A . . . E and battery module compartments F . . . J. As noted above, the battery module compartment firewalls that comprise the middle bar 310A limit propagation of hazards (e.g., excessive heat or fire, fluid leaks, etc.) between battery module compartments A . . . E and battery module compartments F . . . J. The tunnel space 315A optionally permits wireless communication (e.g., optical communication) between the battery modules inserted into the battery compartments A . . . J from the Battery Module Controller (BMC) to the Battery Junction Box (BJB), for example, via a light tube arranged inside of the tunnel space. In an example, the tunnel space 315A may be outside of the battery module compartments A . . . J and effectively on 'top' of the battery housing 305A in the middle of the electric vehicle 300A (e.g., along the top of middle bar 310A). Alternatively, as noted above, instead of being defined over, or on 'top', of the battery housing 305A, the tunnel space 315A may instead be vertically aligned (or level) with the battery modules A . . . J in the battery housing 305A in-between adjacent battery module compartments on different lateral sides of the electric vehicle 300A (e.g., two interior walls or firewalls are used to seal each pair of laterally adjacent battery module compartments, with spaces in-between each pair of laterally adjacent battery module compartments defining the tunnel space 315A).

While not shown expressly in the top-perspective depicted in FIG. 3A, one or more busbars (e.g., high-current (HC) busbars, low-current (LC) busbars, etc.) may be deployed along the tunnel space 315A to provide electrical and/or communications connections between battery modules inserted into any of the battery module compartments A . . . J and a battery junction box (BJB). Each battery module compartment may also include an LC module-to-tunnel interface which facilitates a connection between the battery module and the BJB. As used herein, an LC "module-to-tunnel" interface is used to broadly refer to different interface types. For example, for an optical communications interface, the LC module-to-tunnel interface may include light guide(s) (or even an exposed air gap). For a wired communications interface, the LC module-to-tunnel interface may include physical wiring or cabling.

During insertion of a battery module that includes an integrated cover (or endplate), the worker may insert the battery module into a battery module compartment and couple the battery module to at least one corresponding busbar (e.g., via connectors to LC and HC busbars, such as plugs, where the battery module coupling may occur by virtue of the worker pushing or sliding an electrical interface of the battery module into the corresponding connector), and then secure (e.g., by tightening bolts, etc.) the cover (or endplate) to the battery module compartment so that the battery module compartment is sealed. Likewise, during removal, the worker may free or unlock the cover attachment mechanism (e.g., by removing bolts, etc.), and may then slide the battery module out of the battery module compartment. Hence, in at least one embodiment, during either insertion or removal, the worker only accesses the battery module(s) inside one particular subset of battery module compartments and its associated busbar(s) at a time without exposing the workers to the HC busbars. In an embodiment, the BJB may also be positioned in a middle or center (longitudinally) of the electric vehicle 300A on top of the battery housing 305A.

The battery housing 305A described above with respect to FIG. 3A may be based on various battery module mounting area configurations, such as a lateral-inserted battery module mounting area configuration (e.g., battery modules are inserted into a battery module mounting area from the left and right sides of an electric vehicle) which is used to describe various embodiments below. However, while not expressly illustrated, other battery module mounting area configurations are possible, such as vertically-inserted battery module mounting area configurations (e.g., battery modules are inserted into a battery module mounting area from the top or bottom sides of an electric vehicle), hinged-inserted battery module mounting area configurations (e.g., battery module compartments are attached to hinges so that the battery module compartments rotate upwards and downwards via the hinges for battery module insertion), and so on.

Figure 3B:
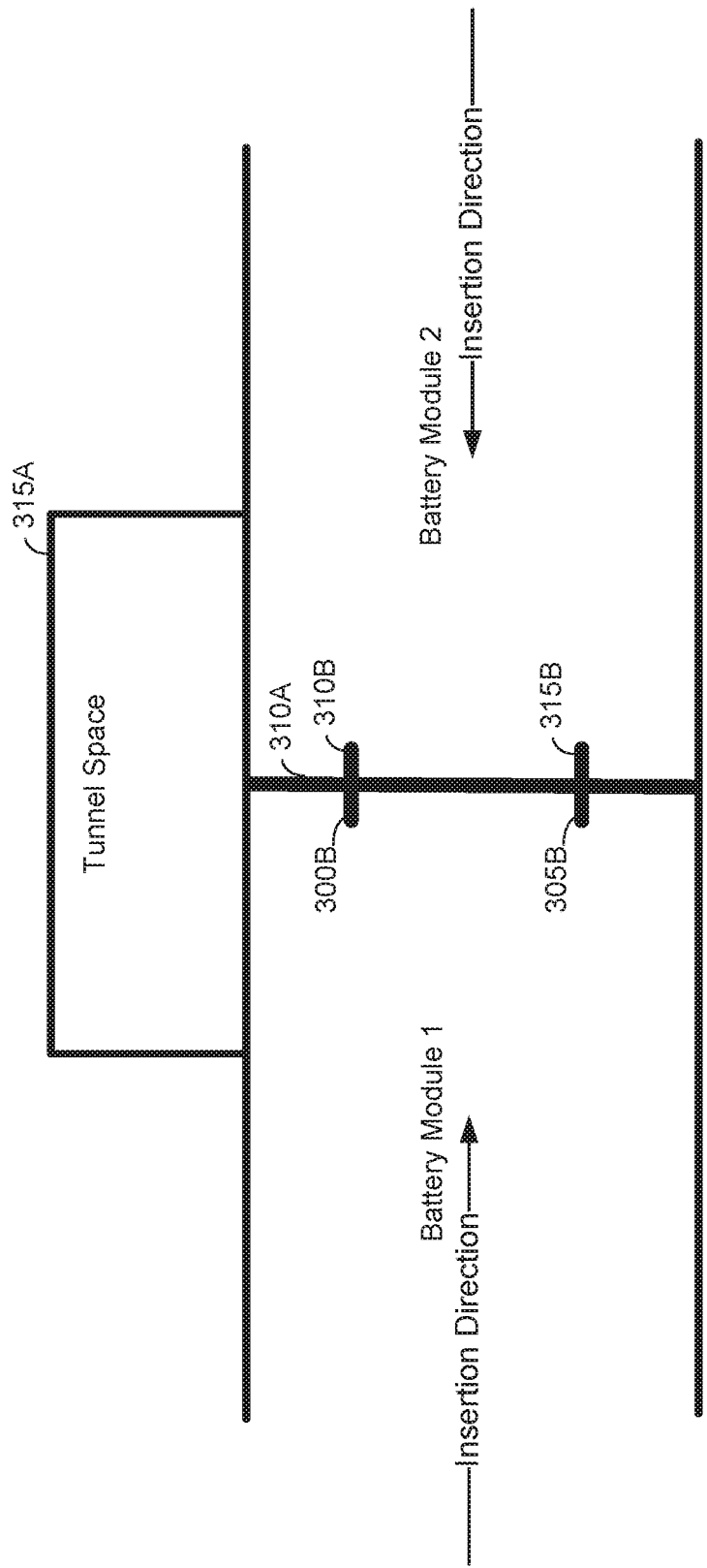
FIG. 3B illustrates a side-perspective of laterally adjacent battery modules installed inside laterally adjacent battery module compartments in accordance with an embodiment of the disclosure.

FIG. 3B illustrates a side-perspective of laterally adjacent battery modules 1 and 2 installed inside laterally adjacent battery module compartments (e.g., battery module compartments A and F, or B and G, or C and H, etc.) in accordance with an embodiment of the disclosure. As shown in FIG. 3B, during insertion, the battery modules 1 and 2 are placed inside laterally adjacent battery module compartments, and then pushed inwards so that battery modules 1 and 2 slide towards the firewall (e.g., middle bar 310A).

Referring to FIG. 3B, the middle bar 310A may include a set of fixation pins in each of the battery module compartments (e.g., each of battery module compartments A through J in FIG. 3A). For example, the battery module compartment into which battery module 1 is inserted includes at least fixation pins 300B and 305B, while the battery module compartment into which battery module 2 is inserted includes at least fixation pins 310B and 315B. The fixation pins 300B-315B are configured to be aligned with fixation recesses on the respective battery modules 1 and 2 during battery module insertion. For example, the middle bar 310A may include one fixation pin for each respective fixation recess on a corresponding battery module. In one particular example, the battery module may include four fixation recesses as shown with respect to the battery module 100 of FIGS. 2A-2B, in which case the middle bar 310A may include four corresponding fixation pins in each battery module compartment. However, in other embodiments, there need not be a 1:1 ratio between fixation pins and fixation recesses (e.g., multiple fixation pins may be aligned with a single fixation recess, less than all of the fixation recesses may be aligned with fixation pins, etc.).

Referring to FIG. 3B, while battery module 1 is fully inserted into its respective battery module compartment, the fixation pins 300B and 305B will extend at least partially into corresponding fixation recesses on battery module 1. Likewise, while battery module 2 is fully inserted into its respective battery module compartment, the fixation pins 310B and 315B will extend at least partially into corresponding fixation recesses on battery module 2.

Referring to FIG. 3B, even after battery module 1 and/or 2 are inserted into respective battery module compartments, a gap may be defined according to the tolerances between each battery module's fixation recesses and the corresponding fixation pins on the middle bar 310A. In other words, the fixation pins do not completely fill their corresponding fixation recesses. As will be described below in more detail, each gap may be filled with one or more stabilization materials, such as a curing material (e.g., an epoxy resin material), a foam material (e.g., polyurethane foam, etc.), or a combination thereof. In an example, the curing material may be configured to cure under normal environmental conditions, although the curing process may optional be sped up via application of heat. The curing material is configured to brace the battery module against external forces (e.g., vibrations, etc.), caused by triggering events such as acceleration of the electric vehicle 300A.

Figure 3C:
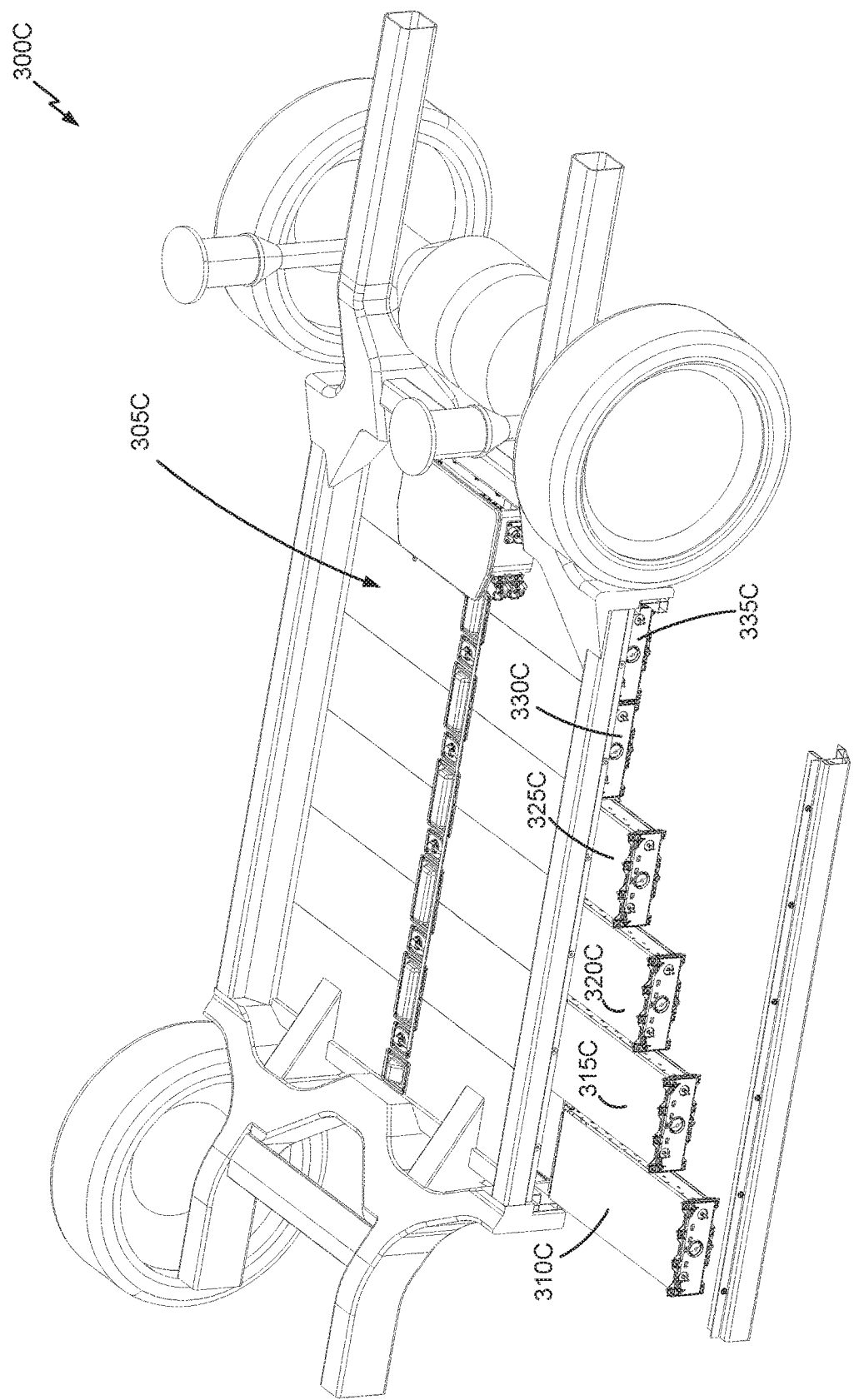
FIG. 3C illustrates an example of an electric vehicle including a battery module mounting area in accordance with an embodiment of the disclosure.

FIG. 3C illustrates an example of an electric vehicle 300C including a battery module mounting area 305C in accordance with an embodiment of the disclosure. Referring to FIG. 3C, the battery module mounting area 305A is configured similarly to the battery housing 305A in FIG. 3A. Various battery modules 310A-335A are depicted at various degrees of insertion into the battery module mounting area 305A. As noted above, upon insertion, fixation recesses on the battery modules 310A-335A may be aligned with corresponding fixation pins on the middle bar 310A, which helps to secure the battery modules 310A-335A inside their respective battery module compartments. Each of the battery modules 310A-335A is further shown as including an insertion-side cover. Once inserted, the insertion-side cover may be secured to the battery module mounting area 305C (e.g., by screwing or bolting), which helps to maintain each battery module's fixation pins inside each respective battery module's fixation recesses during operation of the electric vehicle 300A.

Figure 4A:
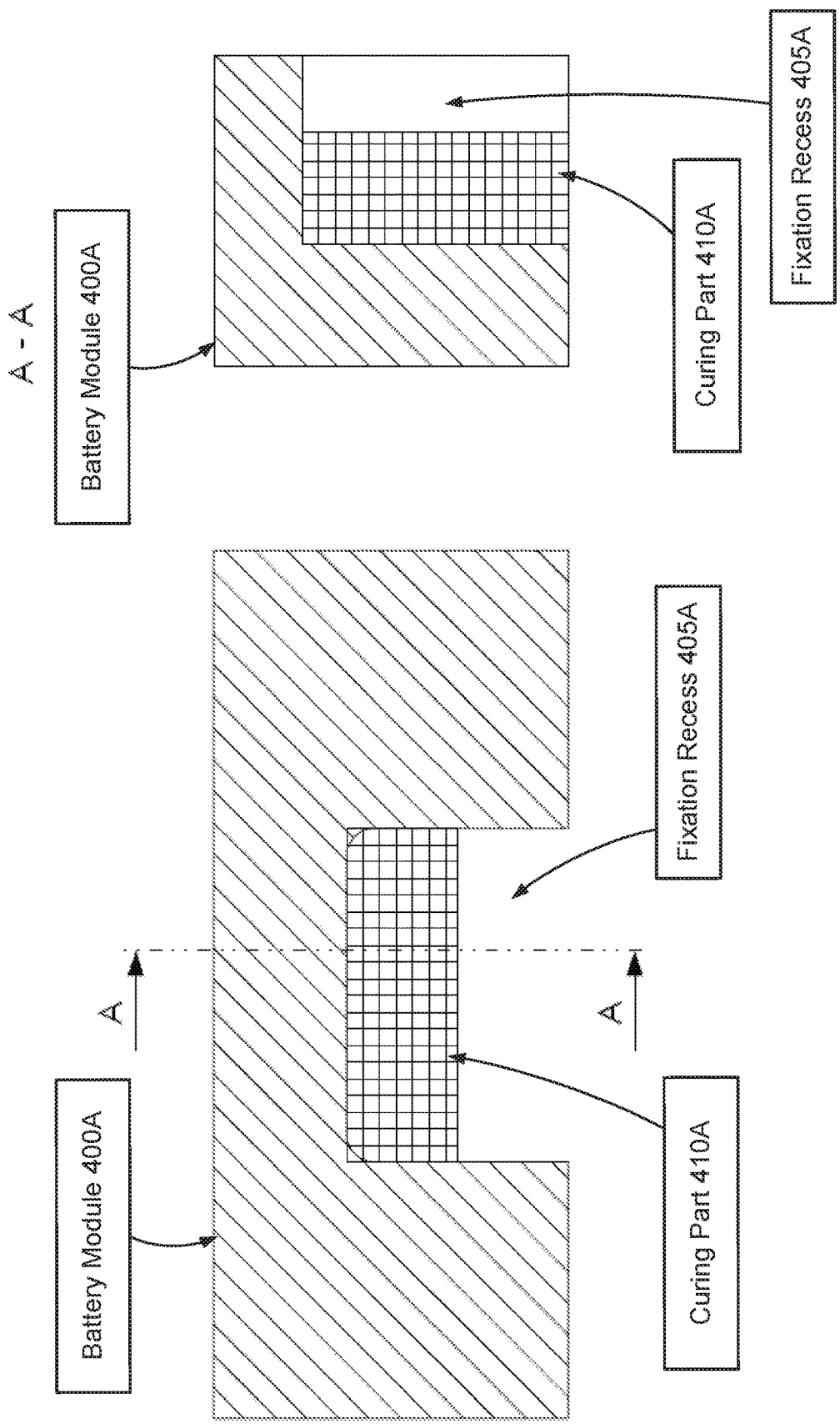
FIG. 4A illustrates a section trough of a battery module fixation arrangement including a battery module with a fixation recess in accordance with an embodiment of the disclosure.

FIG. 4A illustrates a section trough of a battery module fixation arrangement including a battery module 400A with a fixation recess 405A in accordance with an embodiment of the disclosure. The fixation recess 405A is shown in FIG. 4A prior to the battery module 400A being inserted into a respective battery module compartment (i.e., before a corresponding fixation pin extends into the fixation recess 405A). As shown in FIG. 4A, the fixation recess 405A is partially filled with a curing material 410A (e.g., an epoxy resin material). The curing material 410A in FIG. 4A is in an uncured state, such that the curing material 410A is fluid or malleable prior to insertion. As an example, the curing material 410A in FIG. 4A may be applied to the fixation recess 405A just prior to the associated battery module being inserted into a respective battery module compartment, so that the curing material 410A does not have an opportunity to fully cure (or harden) until after insertion.

Figure 4B:
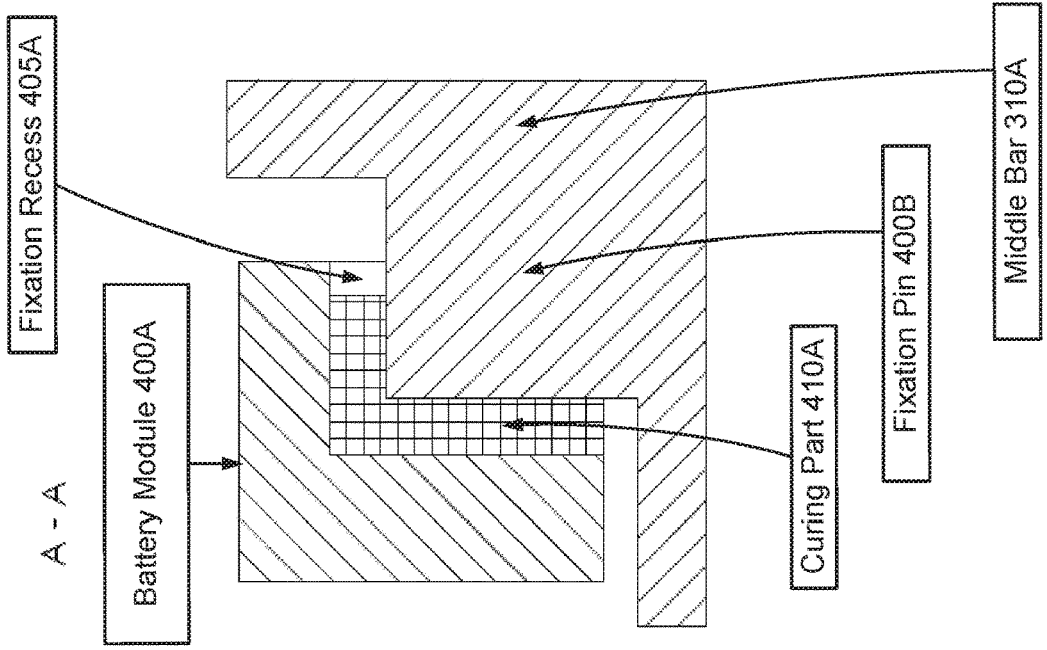
FIG. 4B illustrates the battery module fixation arrangement of FIG. 4A after insertion of the battery module into a respective battery module compartment in accordance with an embodiment of the disclosure.
Figure 4B:
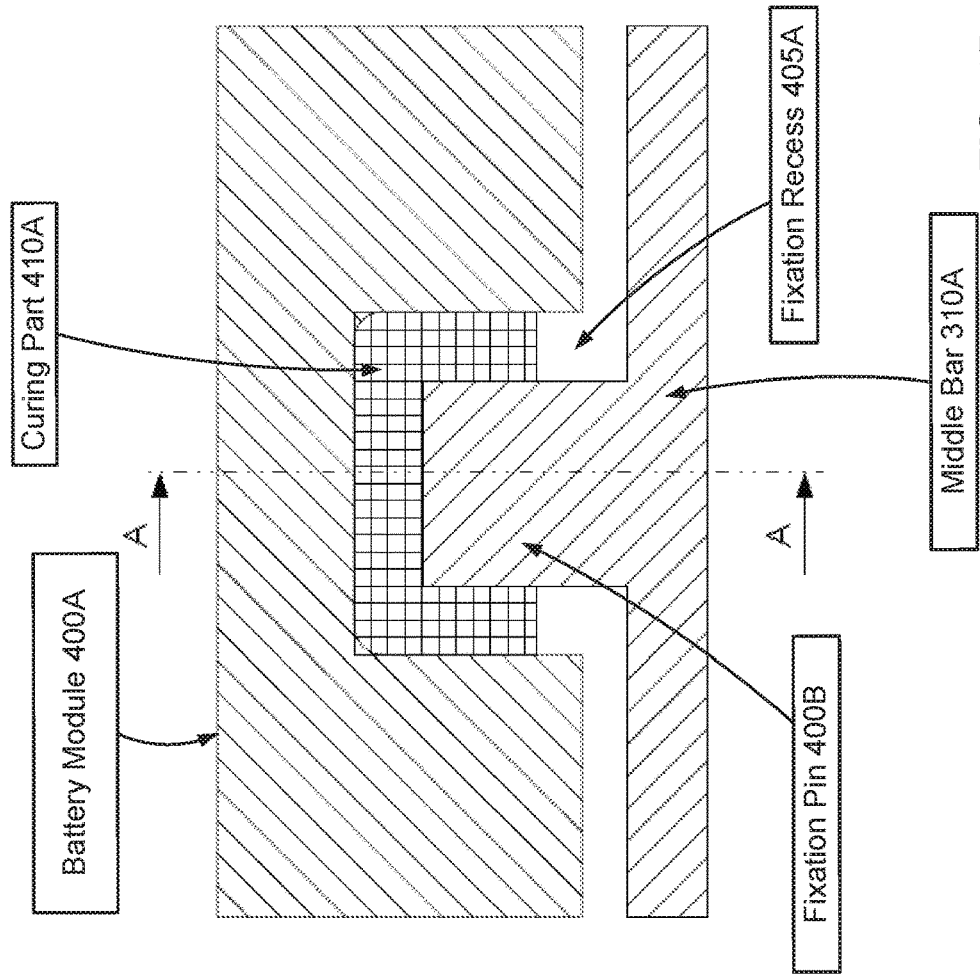

FIG. 4B illustrates the battery module fixation arrangement of FIG. 4A after insertion of the battery module 400A into a respective battery module compartment in accordance with an embodiment of the disclosure. As shown in FIG. 4B, fixation pin 400B extends into the fixation recess 405A, with a gap formed there between. The gap is filled in part with the curing material 410A, which is contacted by the fixation pin 400B. In particular, a head of the fixation pin 400B contacts the curing material 410A which causes some of the curing material 410A to become displaced and to move around a shaft of the fixation pin 400B. The curing material 410A continues to cure until it is hardened, which helps to stabilize a position of the fixation pin 400B and stabilize the battery module 400A inside the battery module compartment by equalizing the tolerances.

Referring to FIGS. 4A-4B, the fixation recess 405A and/or fixation pin 400B may be coated, prior to insertion of the battery module into the battery module compartment, with a coating (e.g., Polytetrafluoroethylene (PTFE)) configured to reduce or prevent adhesion of the fixation recess 405A and/or fixation pin 400B to the curing material 410A.

Figure 5:
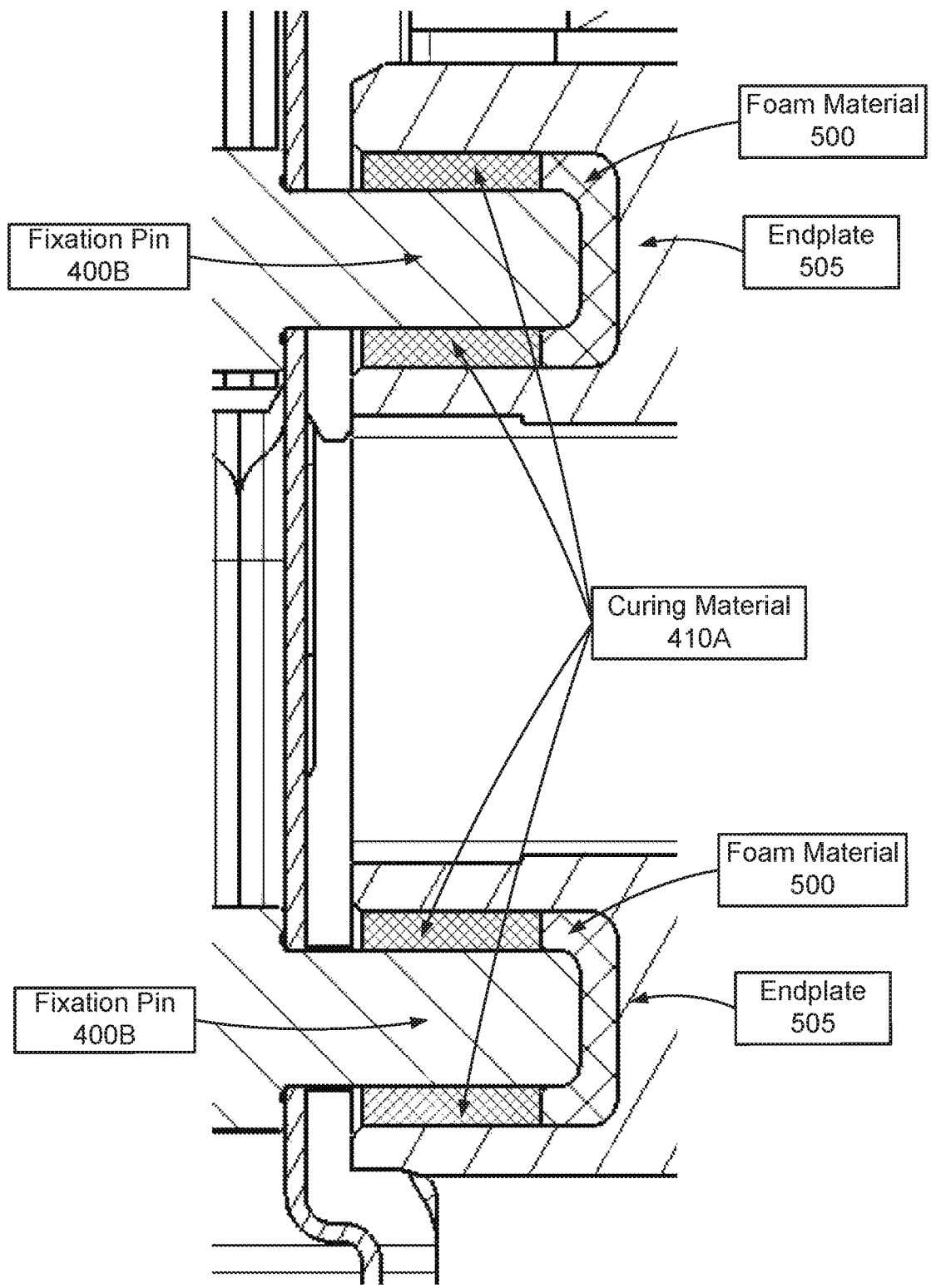
FIG. 5 illustrates another battery module fixation arrangement in accordance with an embodiment of the disclosure.

FIG. 5 illustrates another battery module fixation arrangement in accordance with an embodiment of the disclosure. In FIG. 5, instead of filling the fixation recess 405A with the curing material only, the fixation recess 405A is filled with a combination of the curing material 410A and a foam material 500. The foam material 500 may be positioned more deeply in the fixation recess 405A relative to the curing material 410A, such that the foam material 500 is arranged at a head of the fixation pin 400B while the curing material 410A (after insertion) is arranged around a shaft of the fixation pin 400B. The foam material 500 is placed against an endplate 505 of the battery module (e.g., the rear endplate shown in FIGS. 2A-2B) inside of respective fixation recesses.

Referring to FIG. 5, the foam material 500 is configured to compensate for different thermal elongation characteristics between the battery module and battery module compartment, while the curing material 410A (after curing) is hardened and provides rigidity in terms of lateral battery module movement perpendicular to the insertion direction. Similar to FIGS. 4A-4B, the fixation recess 400A and/or fixation pin 400B may be coated, prior to insertion of the battery module into the battery module compartment, with a coating (e.g., PTFE) configured to reduce or prevent adhesion of the fixation recess 400A and/or fixation pin 400B to the curing material 410A. In an example, the foam material 500 is configured to cushion the fixation pin 400B while permitting relative movement along the insertion direction (e.g., in response to heat elongation, crash forces, etc.). Accordingly, the battery module is substantially secured or fixed in a radial direction, while granting tolerance compensation in a horizontal direction due to the flexibility of the foam material 500.

Figure 6A:
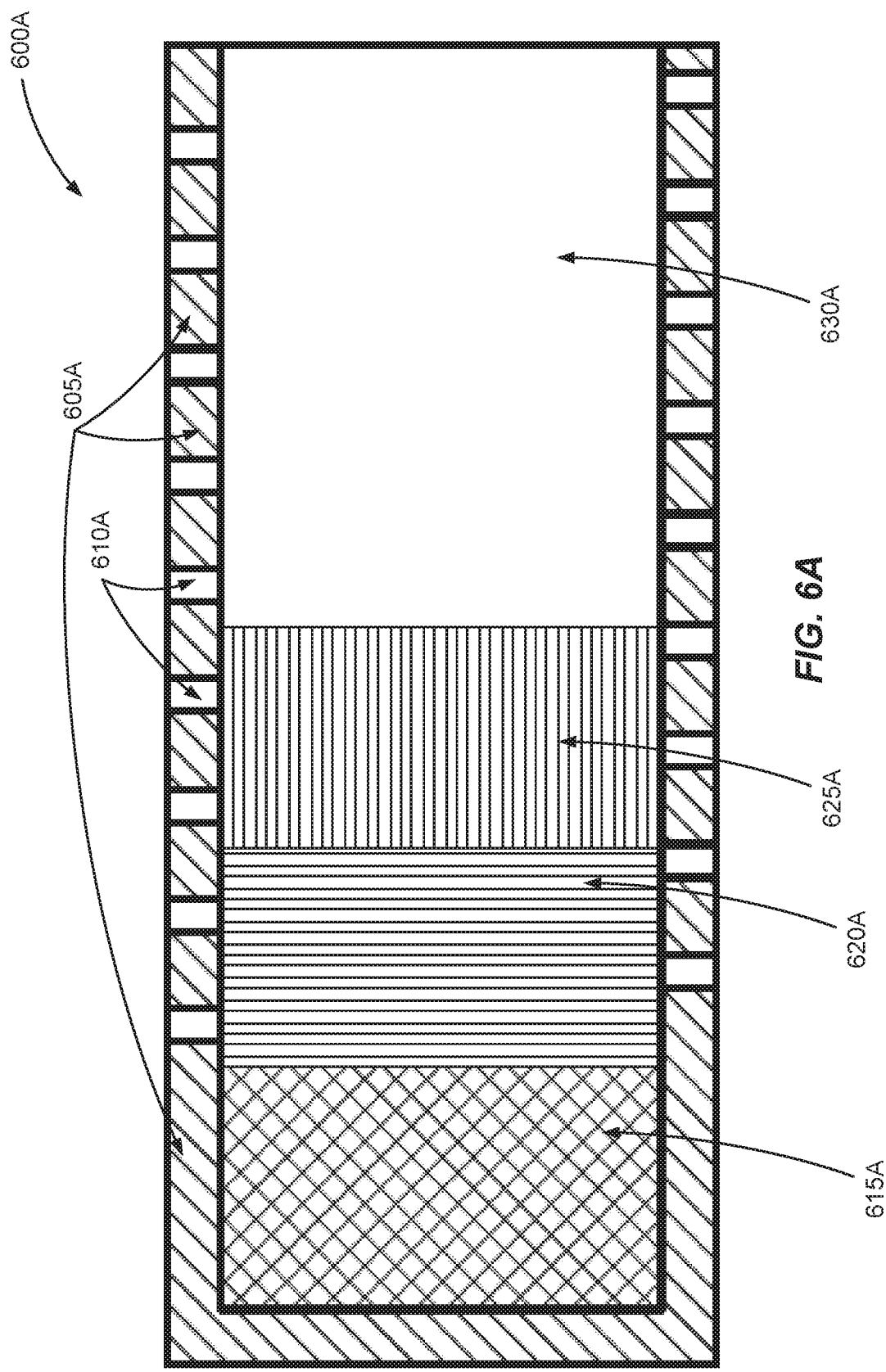
FIGS. 6A-6C illustrate a cartridge-based pin-to-recess interface in accordance with embodiments of the disclosure.
Figures 1, 6B:
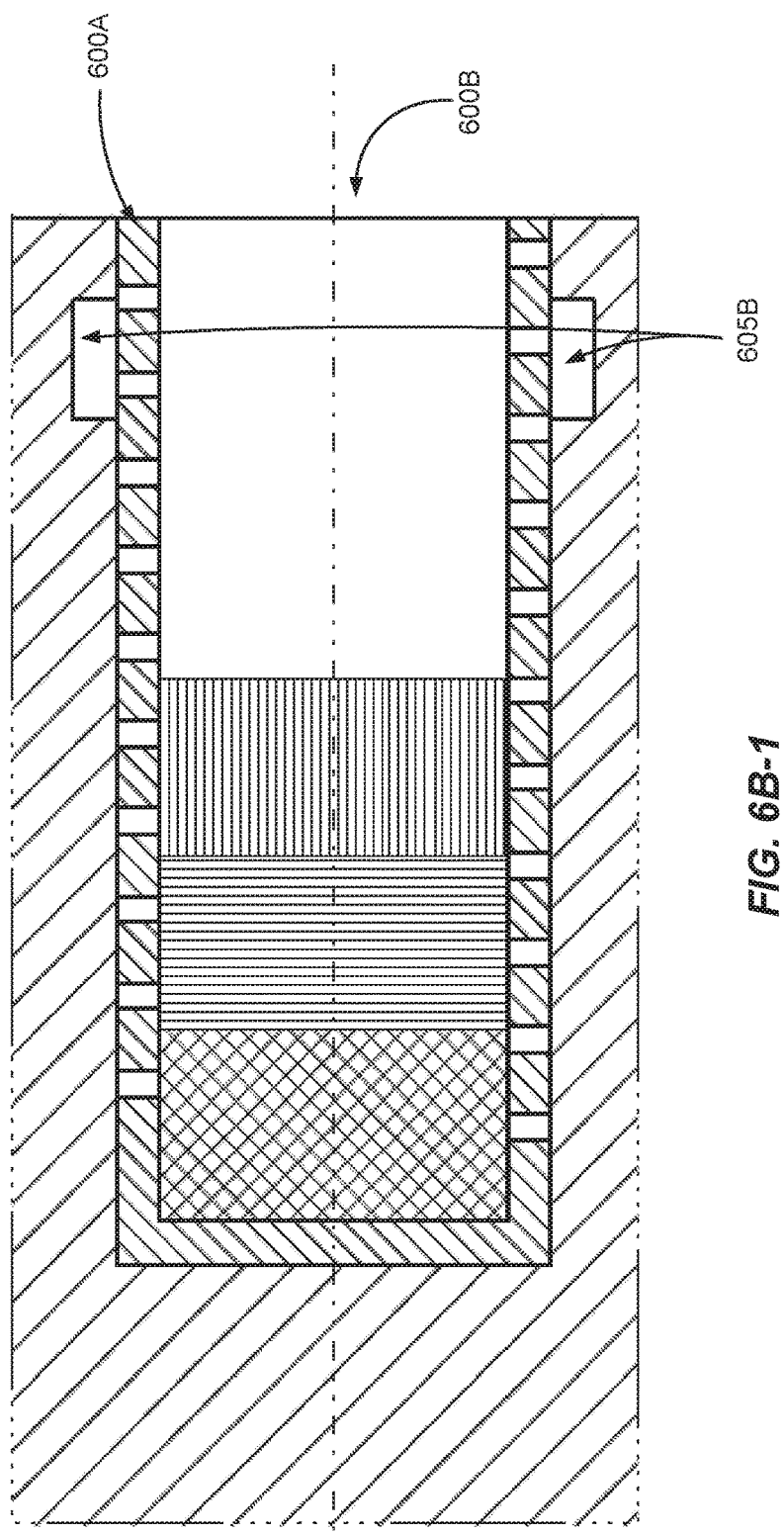
Figures 2, 6B:
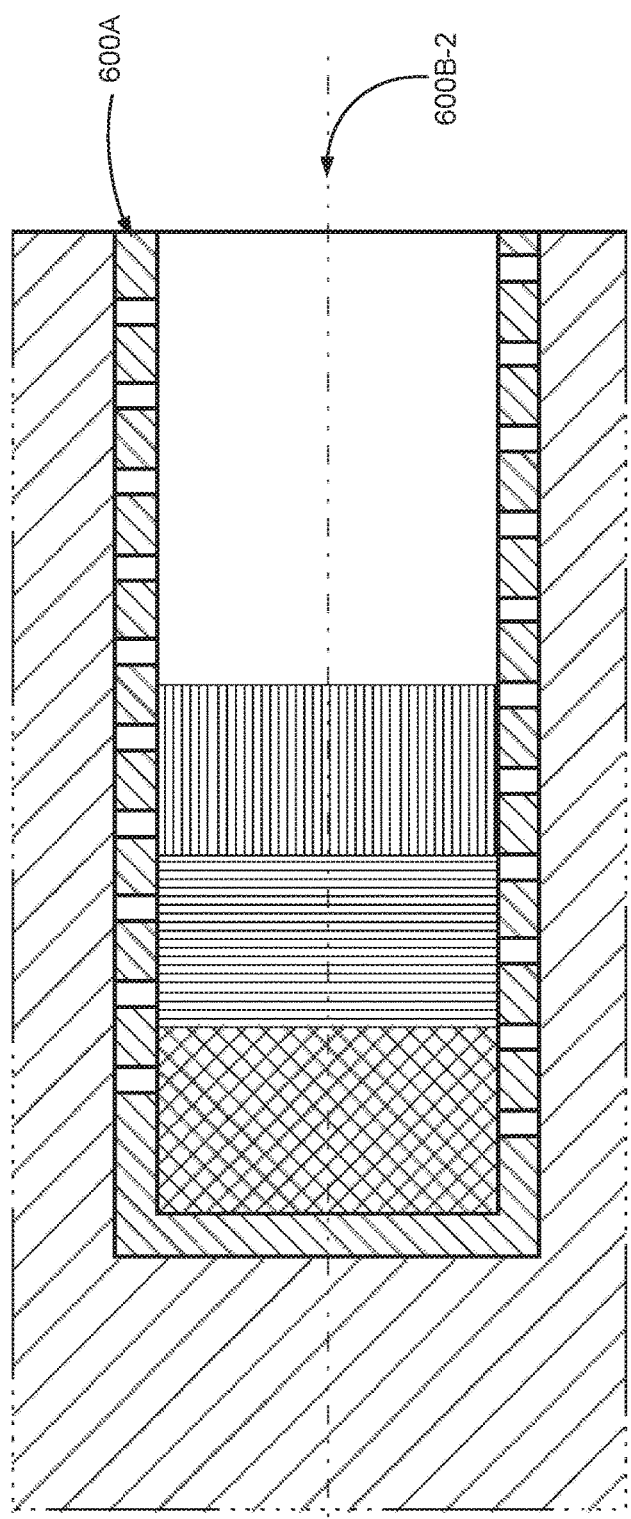
Figure 6C:
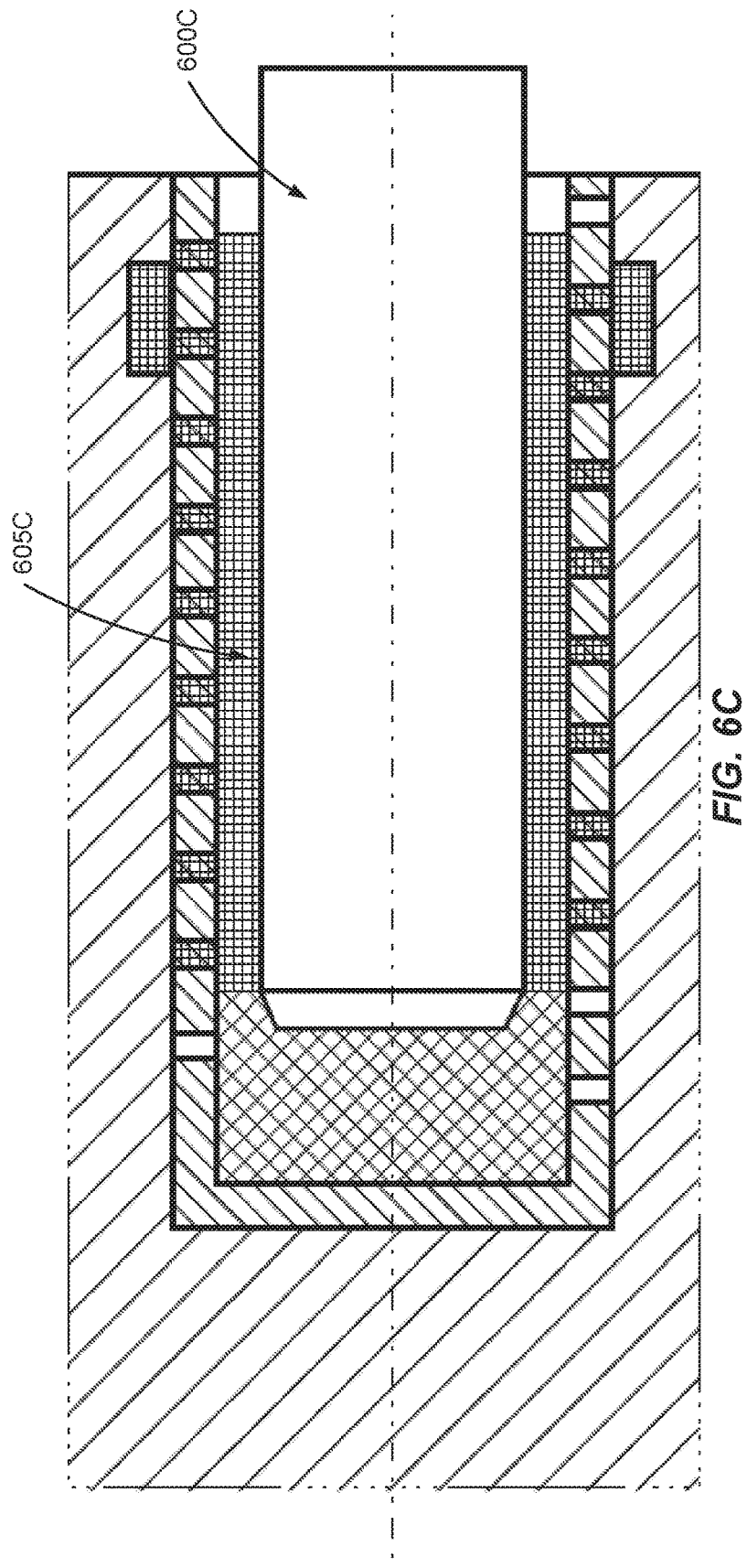

FIGS. 6A-6C illustrate a cartridge-based pin-to-recess interface in accordance with embodiments of the disclosure. In particular, FIG. 6A depicts a cartridge 600A, FIGS. 6B-1 and 6B-2 depict the cartridge 600A after insertion into fixation recesses 600B and 600B-1, respectively, and FIG. 6C depicts the cartridge 600A after a battery module containing the cartridge 600A in the fixation recess 600B is inserted into a battery module compartment, causing a fixation pin 600C to rupture the cartridge 600A.

Referring to FIG. 6A, the cartridge 600A includes an outer layer (or cartridge frame) that comprises solid sections 605A and perforations 610A. The solid sections 605A of the cartridge frame may be formed from plastic, sheet metal, thin wire gauze, or any combination thereof. The perforations 610A may be actual holes in the cartridge 600A (e.g., bored into the outer plastic or sheet metal layer), or alternatively may be gaps where liquid can flow (e.g., if the outer layer is formed from thin wire gauze). In any case, when under pressure from a fixation pin, a liquid curing material can flow through the perforations 610A outside of the cartridge 600A. The cartridge 600A is divided into various sections, which are each separated from adjacent section(s) with a dividing wall (e.g., brittle foil or glass) that is configured to be breached (or ruptured) by a fixation pin during insertion of the battery module into the battery module compartment.

Referring to FIG. 6A, the cartridge 600A includes a foam material section 615A, a first curing material component section 620A, a second curing material component section 625A, and an empty section 630A (e.g., to permit space for the fixation pin after insertion). In an example, the curing material may correspond to a 2-component glue (or epoxy resin), with one component contained in first curing material component section 620A, and the other component contained in the second curing material component section 625A. In other embodiments, the curing material may be formed from a single component epoxy resin material (or glue). While contained in separate sections, the 2-component glue does not mix and thereby does not begin to cure (or harden). However, when the dividing wall between the first curing material component section 620A and the second curing material component section 625A is ruptured by a fixation pin during battery module insertion, the 2-component glue reacts chemically and begins to cure (or harden).

Referring to FIG. 6B-1, the cartridge 600A is shown as arranged inside a fixation recess 600B. As shown in FIG. 6B-1, the fixation recess 600B includes an undercut (or groove) 605B. The undercut 605B may be a continuous ring around the fixation recess 600B, or alternatively may be staggered into sections. The undercut 605B is arranged for tolerance compensation by storing overflow from the curing material after the dividing wall between the first curing material component section 620A and the second curing material component section 625A is ruptured.

Referring to FIG. 6B-2, the cartridge 600A is shown as arranged inside a fixation recess 600B-2. As shown in FIG. 6B-2, the fixation recess 600B-2 omits the undercut (or groove) 605B shown with respect to fixation recess 600B-1 in FIG. 6B-1. Accordingly, the undercut 605B is an optional implementation feature.

Referring to FIG. 6C, the cartridge 600A is shown as ruptured by a fixation pin 600C after insertion of the battery module into the battery module compartment. More specifically, the dividing walls between the sections 615A-630A are ruptured, such that the curing material components from the first and second curing material component sections 620A-625A mix to form a curing material 605C, which oozes through the perforations 605A into the undercut 605B. The undercut 605B functions as an overflow chamber that stores excess or overflow curing material 605C. The head of the fixation pin 600C is in contact, and thereby cushioned by, the foam material from the foam material section 615A. After mixing and curing, the curing material 605C forms a hardened material provides rigidity in terms of lateral battery module movement perpendicular to the insertion direction. As noted above, the fixation recess 600B and/or fixation pin 600C may be coated, prior to insertion of the battery module into the battery module compartment, with a coating (e.g., PTFE) configured to reduce or prevent adhesion of the fixation recess 600B and/or fixation pin 600B to the curing material 605C.

Figure 6D:
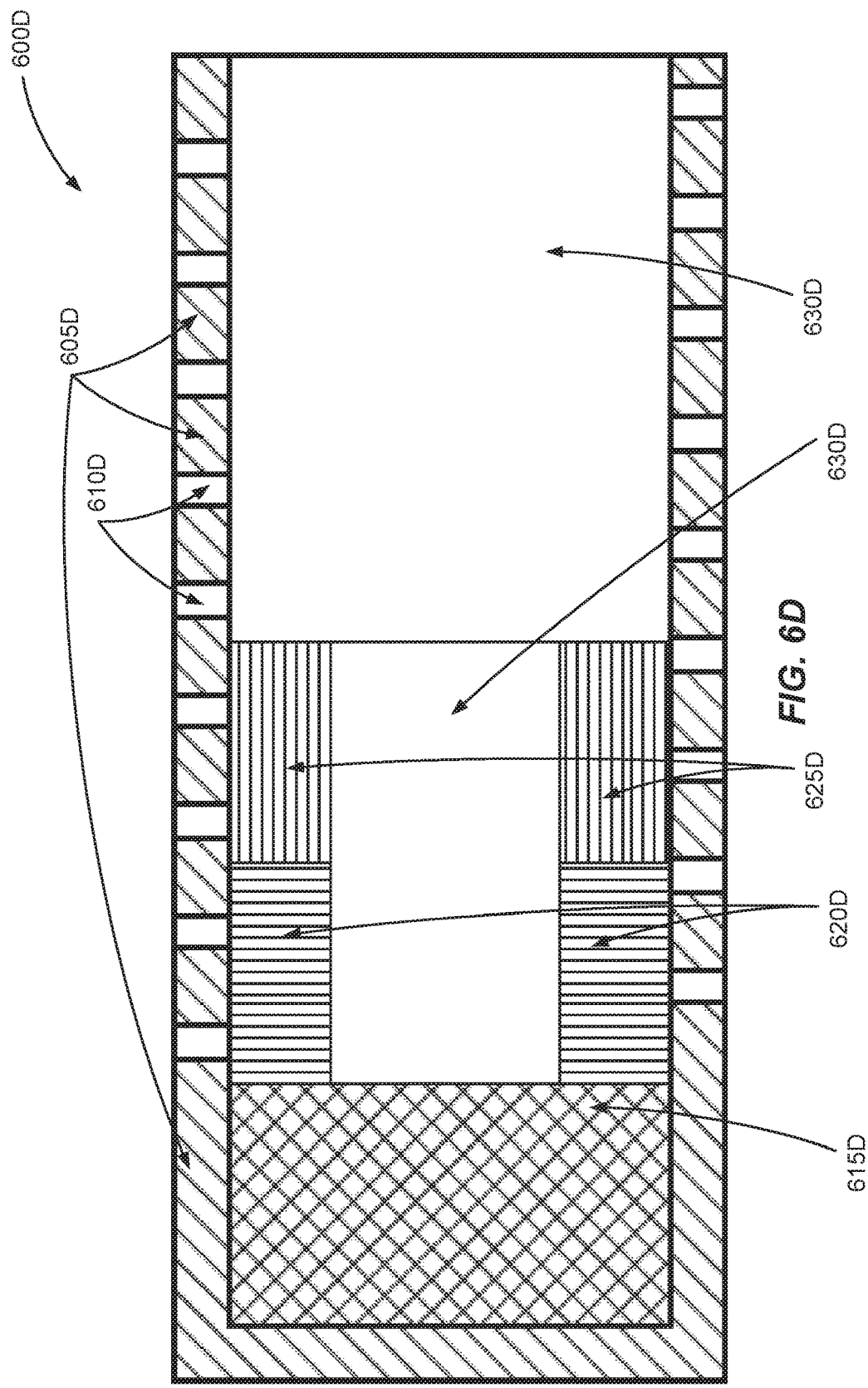
FIGS. 6D-6E illustrate a cartridge-based pin-to-recess interface in accordance with other embodiments of the disclosure.
Figure 6E:
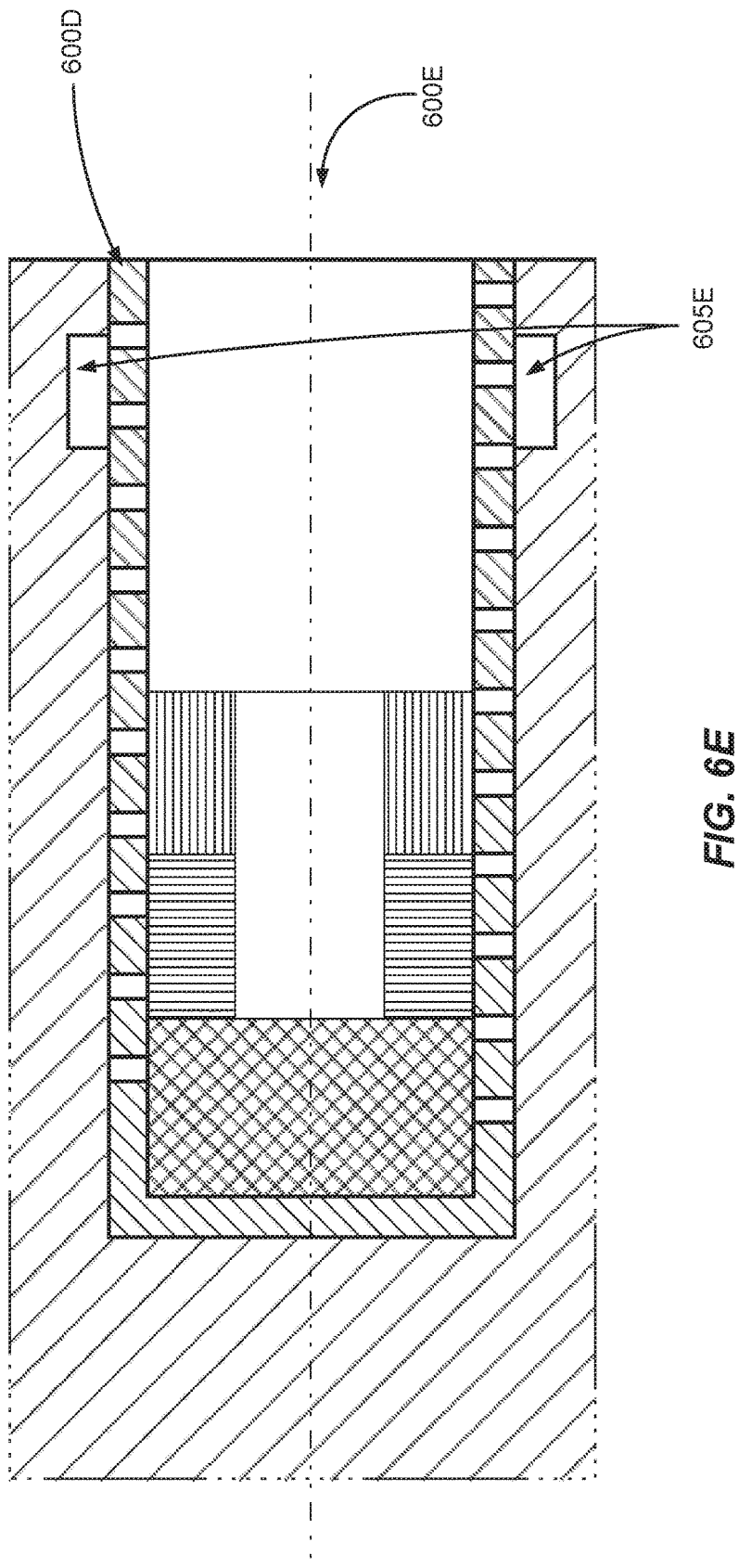

FIGS. 6D-6E illustrate a cartridge-based pin-to-recess interface in accordance with other embodiments of the disclosure. In particular, FIG. 6D depicts a cartridge 600D, and FIG. 6E depicts the cartridge 600D after insertion into a fixation recess 600E.

Referring to FIG. 6D, similar to the cartridge 600A of FIG. 6A, the cartridge 600D includes an outer layer (or cartridge frame) that comprises solid sections 605D and perforations 610D. The solid sections 605D of the cartridge frame may be formed from plastic, sheet metal, thin wire gauze, or any combination thereof. The perforations 610D may be actual holes in the cartridge 600D (e.g., bored into the outer plastic or sheet metal layer), or alternatively may be gaps where liquid can flow (e.g., if the outer layer is formed from thin wire gauze). In any case, when under pressure from a fixation pin, a liquid curing material can flow through the perforations 610D outside of the cartridge 600D. The cartridge 600D is divided into various sections, which are each separated from adjacent section(s) with a dividing wall (e.g., brittle foil or glass) that is configured to be breached (or ruptured) by a fixation pin during insertion of the battery module into the battery module compartment.

Referring to FIG. 6D, the cartridge 600D includes a foam material section 615D, a first curing material component section 620D, a second curing material component section 625D, and an empty section 630D (e.g., to permit space for the fixation pin after insertion in order to reduce curing material overflow inside of the fixation recess). In an example, the curing material may correspond to a 2-component glue (or epoxy resin), with one component contained in first curing material component section 620D, and the other component contained in the second curing material component section 625D. In another example, the curing material may be formed from a single component epoxy resin material (or glue). While contained in separate sections, the 2-component glue does not mix and thereby does not begin to cure (or harden). However, when the dividing wall between the first curing material component section 620D and the second curing material component section 625D is ruptured by a fixation pin during battery module insertion, the 2-component glue reacts chemically and begins to cure (or harden).

In contrast to the cartridge 600A of FIG. 6A where the first curing material component section 620A and the second curing material component section 625A are implemented as continuous sections (e.g., without a gap in their respective center areas), the cartridge 600D configures the first curing material component section 620D and the second curing material component section 625D as two ring-shaped sections which an empty interior area 630D. In an example, empty interior area 630D may be configured so as to make more room for a fixation pin after insertion into the fixation recess.

Referring to FIG. 6E, the cartridge 600D is shown as arranged inside a fixation recess 600E. As shown in FIG. 6E, the fixation recess 600E includes an undercut (or groove) 605E. The undercut 605E may be a continuous ring around the fixation recess 600E, or alternatively may be staggered into sections. The undercut 605E is arranged for tolerance compensation by storing overflow from the curing material after the dividing wall between the first curing material component section 620D and the second curing material component section 625D is ruptured. Alternatively, as shown above with respect to FIG. 6B-1, the undercut 605B can be omitted. For example, if the empty interior area 630D inside the ring-shaped first and second curing material component sections 620D and 625D is large enough, the undercut 605E may be omitted.

When the cartridge 600D is ruptured by a fixation pin after insertion of the battery module into the battery module compartment, the result is similar to FIG. 6C, which has already been described above.

With respect to FIGS. 6A-6E, after insertion of a fixation pin, at least part of the head of the fixation pin near the foam material section will be covered by the curing material, which may block axial movement of the battery module. In an example, the axial movement blockage problem may be mitigated by configuring the undercut to be very thin (e.g., below a thickness threshold), such that axial forces (e.g., caused by thermal expansion) can cause the curing material in the undercut to be cracked which permits free movement between the hardened curing material and the inner cylindrical surface of the fixation recess. In another example, the axial movement blockage problem may be mitigated by omitting the undercut altogether as shown in FIG. 6B-2. In this case, any overflow of the curing material may be compensated via space inside of the fixation recess, such as the empty interior area 630D in FIG. 6D. In another example, as depicted below with respect to FIG. 6F, the axial movement blockage problem may be mitigated by maintaining the curing material to be very thin in the axial direction (e.g., at the tip or head of the fixation pin), such that the fixation pin can punch through any hardened curing material in this area.

Figure 6F:
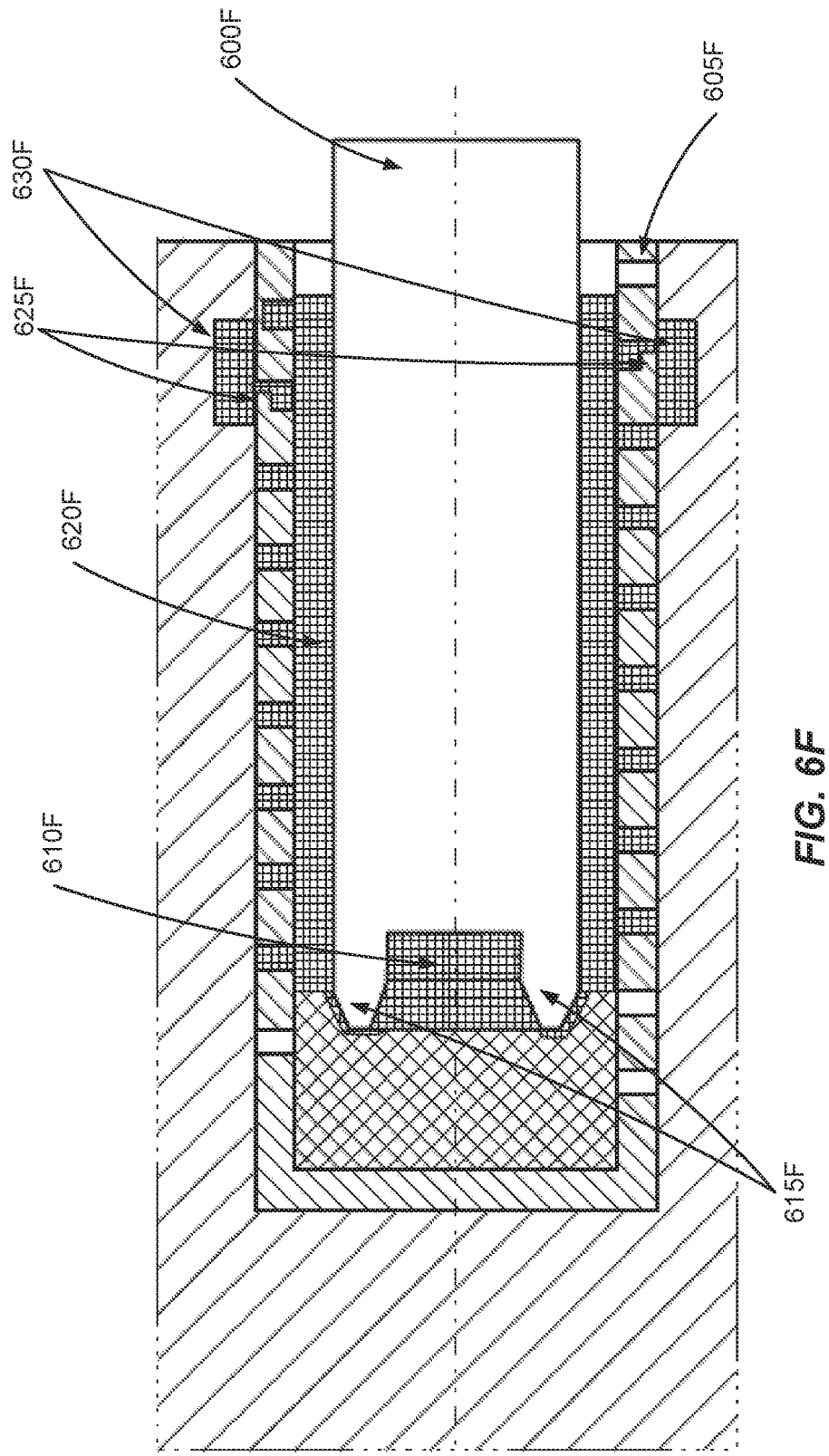
FIG. 6F illustrates a fixation pin that is inserted inside a cartridge of a respective fixation recess.

Referring to FIG. 6F, a fixation pin 600F is shown as inserted inside a cartridge 605F of a respective fixation recess. The cartridge 605F may be configured similarly to the cartridge 600A of FIG. 6A or the cartridge 600D of FIG. 6D. In FIG. 6F, the shape of a head of the fixation pin 605F includes a cavity 610F (or hollowed middle section) and an outer ring 615F. A thickness of curing material 620F along the outer ring 615F is low enough such that axial forces will cause the curing material 620F in this particular section to crack, such that the fixation pin 600F may move freely (e.g., in response to thermal expansion). Also, the cavity 610F provides additional space for curing material overflow. Also shown in FIG. 6F is a predetermined breaking point 625F which is integrated into a perforation that is adjacent to an undercut 630F. In an example, both the predetermined breaking point 625F and the undercut 630F may be ring-shaped.

While FIGS. 1-6F generally describe the fixation recesses integrated into the battery modules while the fixation pins are integrated into the battery module compartments, in other embodiments this relationship can be swapped such that the fixation recesses integrated into the battery module compartments while the fixation pins are integrated into the battery modules. The embodiments noted above are thereby illustrative of how fixation pins and fixation recesses can be used to fix a location of a battery module inside a battery module compartment, irrespective of how the fixation pins and fixation recesses are actually arranged. In other words, a first battery module component (e.g., either the battery module or battery module compartment) may include the fixation recesses, while a second battery module component (e.g., either the battery module or battery module compartment) may include the fixation pins.

Figure 7:
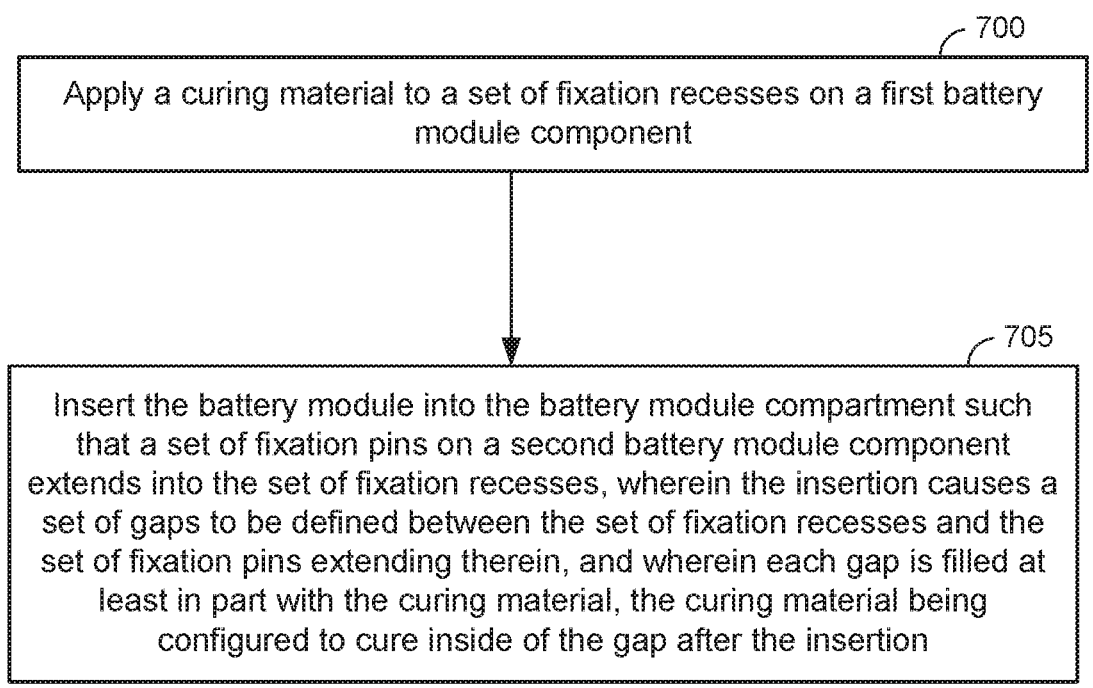
FIG. 7 illustrates a procedure for fixation of a battery module in a battery module compartment of an energy storage system in accordance with an embodiment of the disclosure.

FIG. 7 illustrates a procedure for fixation of a battery module in a battery module compartment of an energy storage system in accordance with an embodiment of the disclosure.

Referring to FIG. 7, at block 700, a curing material (e.g., an epoxy resin material such as a single component glue or 2-component glue, etc.) is applied to a set of fixation recesses on a first battery module component. At block 705, the battery module is inserted into the battery module component such that a set of fixation pins on a second battery module component extends into the set of fixation recesses. The insertion of block 705 causes a set of gaps to be defined between the set of fixation recesses and the set of fixation pins extending therein. Each gap is filled at least in part with the curing material, the curing material being configured to cure inside of the gap after the insertion of block 705. As noted above, a foam material may also be used to fill each gap in part. The curing material and/or foam material may be arranged inside of cartridges that are inserted into the fixation recesses prior to insertion of the battery module into the battery module compartment at block 705. Generally, the process of FIG. 7 can be used to achieve the various embodiments described above with respect to FIGS. 4A-6C.

It is generally difficult to fix (or stabilize) battery modules in directions other than the insertion direction. However, in further embodiments, additional stabilization and protection of the battery module can be obtained via an expansion component that is arranged on at least one side of the battery module and an interior surface of the battery module compartment, as shown in FIGS. 8A-10.

Figure 8A:
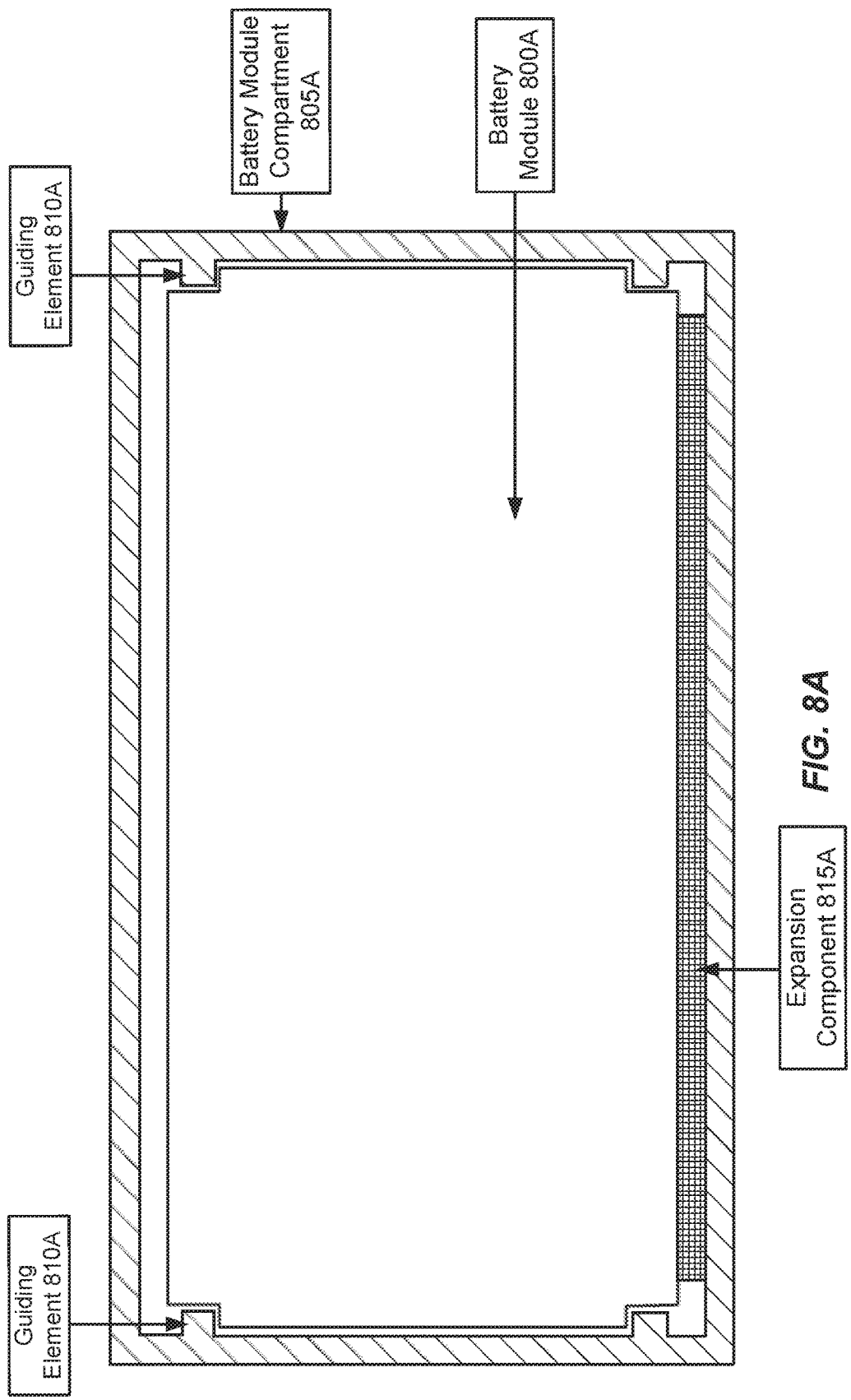
FIGS. 8A-8B illustrate a battery module fixation arrangement in accordance with an embodiment of the disclosure.
Figure 8B:
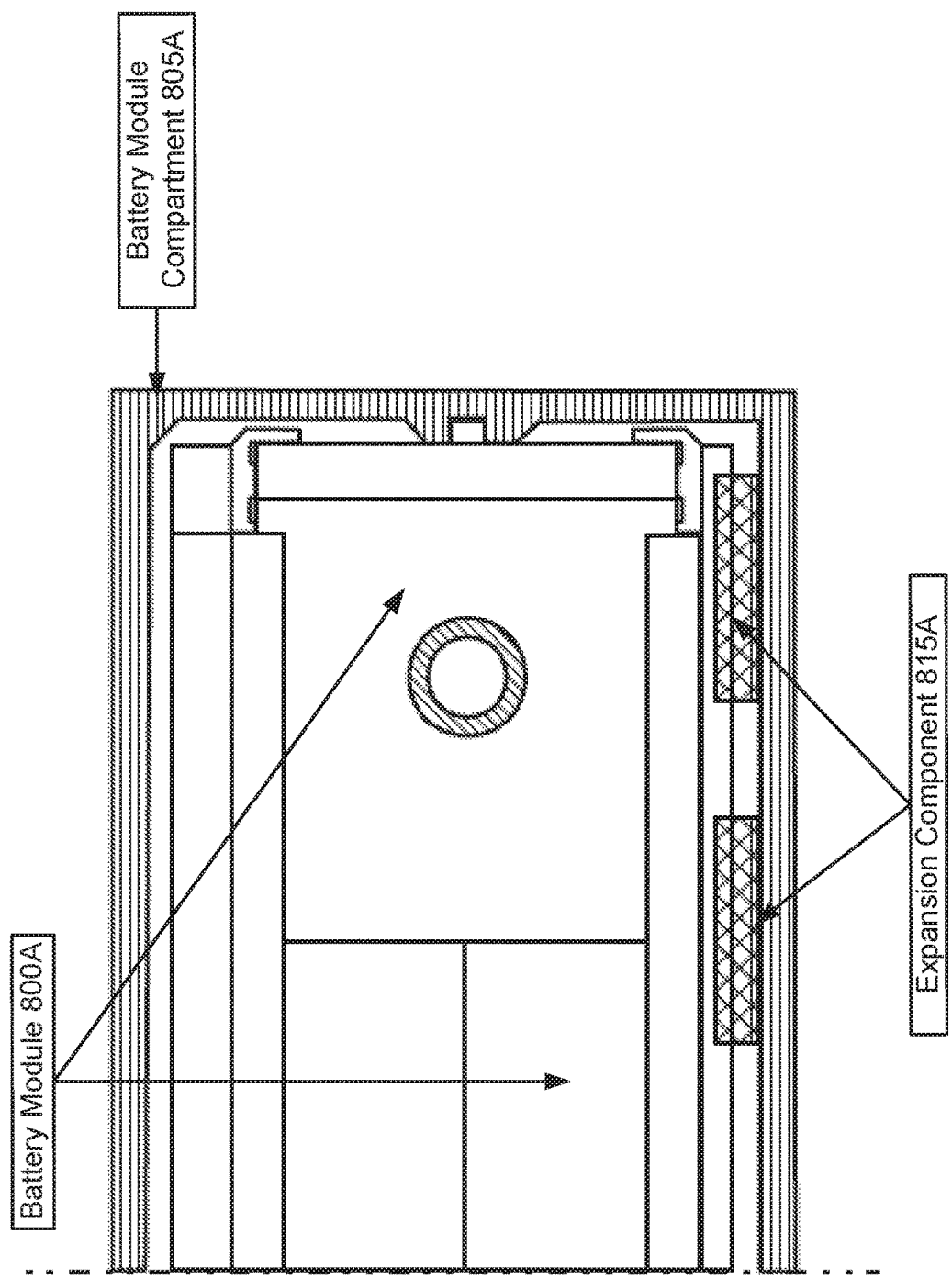

FIGS. 8A-8B illustrate a battery module fixation arrangement in accordance with an embodiment of the disclosure.

Referring to FIG. 8A, a battery module 800A is shown after insertion into a battery module compartment 805A. The battery module compartment 805A includes guiding elements 810A, which may be aligned with guiding elements on the battery module 800A (e.g., such as guiding elements 105 in FIGS. 1-2A or guiding elements 215B in FIG. 2B. In the embodiment of FIG. 8A, an expansion component 815A is arranged on an underside of the battery module 800A. The expansion component 815A is configured to start expanding or continue expanding after the battery module 800A is inserted into an interior surface of the battery module compartment 805A, such that the guiding elements 105 or 215B on the battery module 800A are pushed upwards towards, and make contact with, the guiding elements 810A on the battery module compartment 805A, which helps to secure the battery module 805A in place inside of the battery module compartment 805A.

In other embodiments, the expansion component 815A could be arranged on one or more other sides of the battery module 800A as well. Accordingly, the expansion component arranged is between at least a portion of at least one side (e.g., bottom side, or possible another side) of the battery module 800A and an interior surface of the battery module compartment 805A. The expansion component 815A is configured to expand (e.g., via any of a variety of possible expansion mechanisms described below) after insertion of the battery module 800A into the battery module compartment 805A so as to secure the battery module 800A inside the battery module compartment 805A.

In an example, the expansion component 815A can be a foam element (e.g., polyurethane foam configured to expand after insertion). For example, the foam element can be applied as a series of expanding foam strips, or one or more interior surfaces of the battery module compartment 805A can be sprayed with a foaming spray prior to insertion of the battery module 800A (e.g., in direct contact with an interior surface of the battery module compartment 805A). In another example, the foam element may be arranged inside of a bag instead of being placed in direct contact with the battery module compartment 805A. In this case, the bag (not the foam element itself) is in direct contact with the interior surface of the battery module compartment 805A. Also, a foam contraction material (e.g., a foam contraction liquid) may be injected into the bag to destroy (or collapse) the foam element in order to extract the battery module 800A from the battery module compartment 800A.

In another example, the expansion component 815 can be an inflatable pad (e.g., the inflatable pad is inserted into the battery module compartment while deflated, a battery module is then inserted into the battery module compartment, and the inflatable pad is then inflated or expanded inside the battery module compartment). In this case, pressure (e.g., gas or air pressure, liquid pressure, etc.) inside the inflatable pad can later be released in order to remove the battery module from the battery module compartment. In another example, the expansion component can be implemented as a pneumatic or hydraulic mechanism. For example, the pneumatic or hydraulic mechanism may be configured to exert pneumatic or hydraulic force on the battery module.

FIG. 8B illustrates an alternative perspective of the battery module arrangement depicted in FIG. 8A in accordance with an embodiment of the disclosure. As shown in FIG. 8B, the expansion component 815A is arranged in strips across the bottom of the battery module 800A. As will be appreciated, FIG. 8B emphasizes that the expansion component 815A need not be continuous across the entire underside of the battery module 800A, although such an implementation is also possible. Accordingly, strips of foam, inflatable pads, etc. can be arranged on the interior floor of the battery module compartment prior to battery module insertion, as shown in FIG. 8B.

Figure 9:
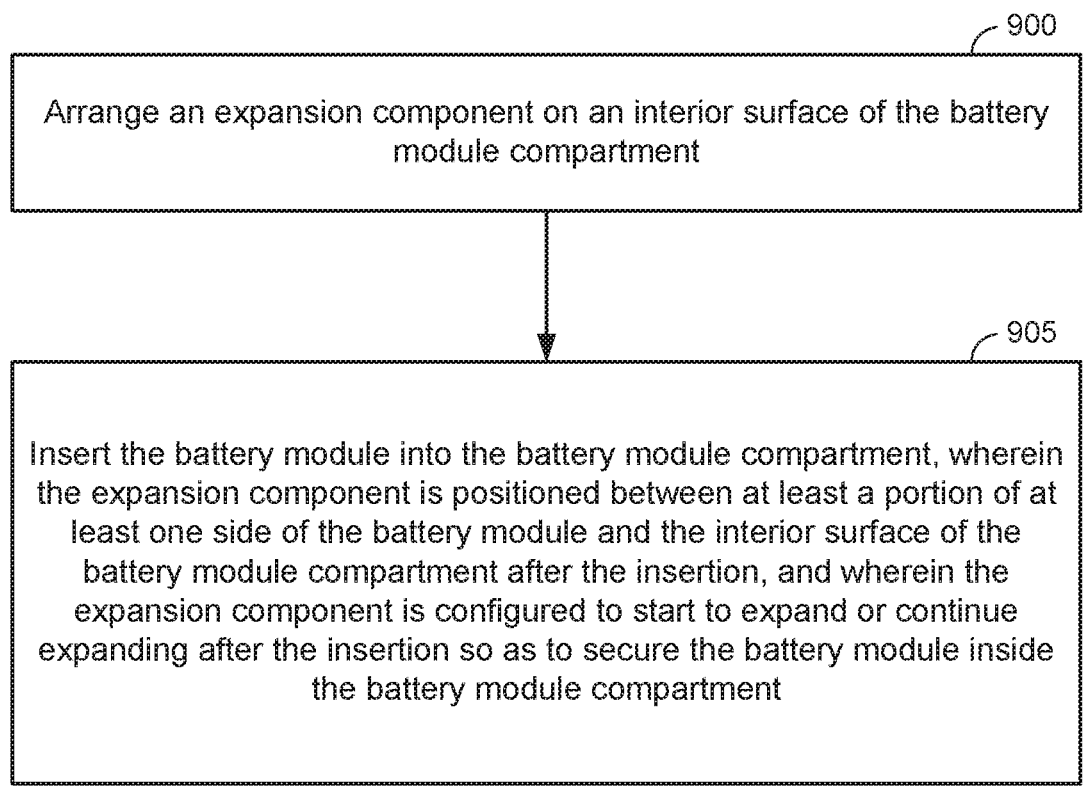
FIG. 9 illustrates a procedure for fixing a battery module inside of a battery module compartment in accordance with an embodiment of the disclosure.

FIG. 9 illustrates a procedure for fixing a battery module inside of a battery module compartment in accordance with an embodiment of the disclosure.

Referring to FIG. 9, at block 900, an expansion component is arranged on an interior surface of the battery module compartment. At block 905, the battery module is inserted into the battery module compartment. At this point, the expansion component is positioned between at least a portion of at least one side of the battery module and the interior surface of the battery module compartment after the insertion. Also, the expansion component is configured to start to expand or continue expanding after the insertion of block 905 so as to secure the battery module inside the battery module compartment. As an example, if the expansion component is expanding foam, the expanding foam may start expanding as soon as applied inside the battery module compartment (e.g., prior to insertion), and may then continue to expand after battery module insertion. In another example, if the expansion component is more controlled (e.g., via inflation, pneumatic or hydraulic pressure, etc.), the expanding component may be triggered to start expanding only after battery module insertion.

As will be appreciated, some expansion component types may support not only an expansion function, but also a contraction function (e.g., deflation) as well. For example, inflatable pads as well as pneumatic or hydraulic mechanisms may support both inflation and deflation functions for the expansion component. Other expansion component types may only support an expansion function, such as certain foam elements. To remove a battery module that is secured by an expanded foam element, a technician may need to essentially rip the battery module off the foam element (i.e., deflation of the foam element may not be possible), which may leave a foam residue on the battery module compartment which can then be cleaned off by the technician. Alternatively, a foam contraction material may be used to collapse the expanded foam element. Below, a process is described with respect to FIG. 10 that pertains particularly to expansion component types that support the contraction function.

Figure 10:
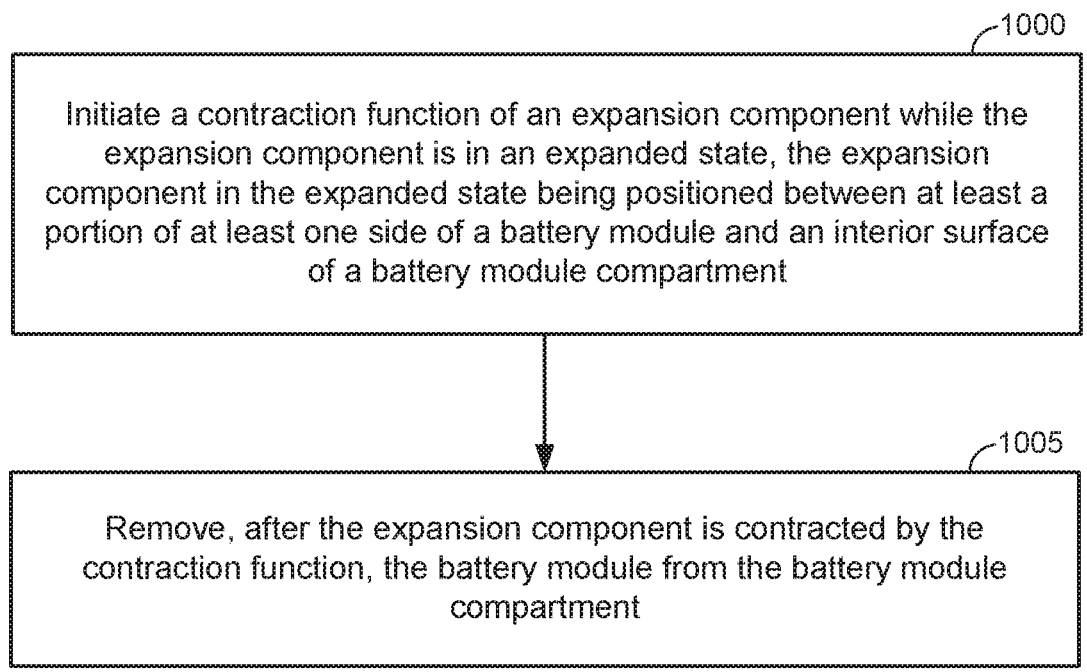
FIG. 10 illustrates a battery module removal procedure in accordance with an embodiment of the disclosure.

FIG. 10 illustrates a battery module removal procedure in accordance with an embodiment of the disclosure.

Referring to FIG. 10, at block 1000, a contraction function of an expansion component is initiated while the expansion component is in an expanded state, the expansion component in the expanded state being positioned between at least a portion of at least one side of the battery module and an interior surface of the battery module compartment. At block 1005, after the expansion component is contracted by the contraction function, the battery module is removed from the battery module compartment.

Referring to FIG. 10, as an example, assume the expansion component corresponds to an inflatable pad. In this case, the contraction function may correspond to deflating the inflatable pad from an inflated state so that the battery module is easier for a technician to remove from the battery module compartment.

Referring to FIG. 10, as an example, assume the expansion component corresponds to a pneumatic or hydraulic mechanism. In this case, the contraction function may correspond to a technician reducing pneumatic or hydraulic force exerted by the expansion component on the battery module, so that the battery module is easier for a technician to remove from the battery module compartment.

Referring to FIG. 10, as an example, assume the expansion component corresponds to a bag containing an expanded foam element. In this case, the contraction function may correspond to a technician injecting a foam contraction material inside the bag to collapse the expanded foam element, so that the battery module is easier for a technician to remove from the battery module compartment.

While the embodiments described above relate primarily to land-based electric vehicles (e.g., cars, trucks, etc.), it will be appreciated that other embodiments can deploy the various battery-related embodiments with respect to any type of electric vehicle (e.g., boats, submarines, airplanes, helicopters, drones, spaceships, space shuttles, rockets, etc.).

While the embodiments described above relate primarily to battery module compartments and associated battery modules and insertion-side covers for deployment as part of an energy storage system for an electric vehicle, it will be appreciated that other embodiments can deploy the various battery-related embodiments with respect to any type of energy storage system. For example, besides electric vehicles, the above-noted embodiments can be applied to energy storage systems such as home energy storage systems (e.g., providing power storage for a home power system), industrial or commercial energy storage systems (e.g., providing power storage for a commercial or industrial power system), a grid energy storage system (e.g., providing power storage for a public power system, or power grid) and so on.

As will be appreciated, the placement of the various battery module compartments in the above-noted embodiments is described as being integrated into a vehicle floor of an electric vehicle. However, it will be appreciated that the general closed compartment profile design may be extended to battery module mounting areas that can be installed in other locations within the electric vehicle (e.g., in a trunk of the electric vehicle, behind one or more car seats, under a front-hood of the electric vehicle, etc.).

The forgoing description is provided to enable any person skilled in the art to make or use embodiments of the invention. It will be appreciated, however, that the invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the embodiments of the disclosure.

The invention claimed is:

1. A battery module fixation arrangement, comprising:
   a battery module compartment;
   a battery module arranged inside the battery module compartment; and
   an expansion component arranged between at least a portion of at least one side of the battery module and an interior surface of the battery module compartment, the expansion component configured to expand after insertion of the battery module into the battery module compartment so as to secure the battery module inside the battery module compartment.

2. The battery module fixation arrangement of claim 1, wherein the expansion component includes a foam element.

3. The battery module fixation arrangement of claim 2, wherein the foam element is placed in direct contact with the interior surface of the battery module compartment, or
   wherein the foam element is arranged inside of a bag.

4. The battery module fixation arrangement of claim 1, wherein the expansion component includes an inflatable pad.

5. The battery module fixation arrangement of claim 1, wherein the expansion component includes a pneumatic or hydraulic mechanism.

6. The battery module fixation arrangement of claim 1, wherein the expansion component is further configured to contract to permit removal of the battery module from the battery module compartment.

7. The battery module fixation arrangement of claim 1, wherein the at least one side includes an underside of the battery module.

8. The battery module fixation arrangement of claim 1, wherein the expansion component is arranged on less than all of the at least one side of the battery module.

9. The battery module fixation arrangement of claim 8, wherein the expansion component is arranged in strips along the at least one side of the battery module.

10. A method of fixing a battery module inside of a battery module compartment, comprising:

arranging an expansion component on an interior surface of the battery module compartment;

inserting the battery module into the battery module compartment, wherein the expansion component is positioned between at least a portion of at least one side of the battery module and the interior surface of the battery module compartment after the inserting, and wherein the expansion component is configured to start to expand or continue expanding after the inserting so as to secure the battery module inside the battery module compartment.

11. The method of claim 10, wherein the expansion component includes a foam element.

12. The method of claim 11, further comprising:

placing the foam element in the battery module compartment before the inserting, wherein the foam element starts to expand after the placing and before the inserting, and wherein the foam element continues to expand before the inserting.

13. The method of claim 12, wherein the placing places the foam element in direct contact with the interior surface of the battery module compartment, or wherein the foam element is arranged inside of a bag, and the placing places the bag in direct contact with the interior surface of the battery module compartment.

14. The method of claim 10, wherein the expansion component includes an inflatable pad.

15. The method of claim 14, further comprising:

placing the inflatable pad in the battery module compartment before the inserting, and inflating the inflatable pad by filling the inflatable pad with a gas or liquid after the inserting.

16. The method of claim 10, wherein the expansion component includes a pneumatic or hydraulic mechanism.

17. The method of claim 10, wherein the expansion component is further configured to contract to permit removal of the battery module from the battery module compartment.

18. The method of claim 10, wherein the at least one side includes an underside of the battery module.

19. The method of claim 10, further comprising:

initiating a contraction function of the expansion component while the expansion component is in an expanded state; and removing, after the expansion component is contracted by the contraction function, the battery module from the battery module compartment.

20. The method of claim 19, wherein the expansion component includes a bag containing a foam element.

21. The method of claim 20, wherein the contraction function includes causing the foam element to collapse based on injection of a foam contraction material into the bag.

22. The method of claim 19, wherein the expansion component includes an inflatable pad.

23. The method of claim 22, wherein the contraction function includes deflating the inflatable pad.

24. The method of claim 19, wherein the expansion component includes a pneumatic or hydraulic mechanism.

25. The method of claim 24, wherein the contraction function includes reducing pneumatic or hydraulic force exerted by the expansion component on the battery module.

26. The method of claim 19, wherein the at least one side includes an underside of the battery module.

* * * * *